(12) United States Patent
Saito et al.

(10) Patent No.: US 7,098,820 B2
(45) Date of Patent: Aug. 29, 2006

(54) DATA RECORDING METHOD

(75) Inventors: Akiya Saito, Kanagawa (JP); Toru Aida, Kanagawa (JP)

(73) Assignee: Sony Corporation, Tokyo (JP)

( * ) Notice: Subject to any disclaimer, the term of this patent is extended or adjusted under 35 U.S.C. 154(b) by 165 days.

(21) Appl. No.: 10/834,185

(22) Filed: Apr. 29, 2004

(65) Prior Publication Data
US 2004/0264336 A1 Dec. 30, 2004

(30) Foreign Application Priority Data
May 21, 2003 (JP) .............................. 2003-143268

(51) Int. Cl.
*H03M 7/00* (2006.01)
(52) U.S. Cl. .................. 341/59; 341/102; 341/103
(58) Field of Classification Search .................. 341/59
See application file for complete search history.

(56) References Cited

U.S. PATENT DOCUMENTS 5,952,944 A * 9/1999 Nonaka et al. ............... 341/59
6,281,815 B1 * 8/2001 Shim et al. .................... 341/59
6,577,255 B2 * 6/2003 Hayami et al. ............... 341/59
6,765,511 B2 * 7/2004 Hayami ........................ 341/59
6,853,684 B2 * 2/2005 Wu et al. .................... 375/253
6,861,965 B2 * 3/2005 Kayanuma et al. ........... 341/59
6,914,544 B2 * 7/2005 Nakagawa et al. ........... 341/58

OTHER PUBLICATIONS

U.S. Appl. No. 10/488,206, filed Mar. 1, 2004, Aida et al.
U.S. Appl. No. 10/834,185, filed Apr. 29, 2004, Saito et al.

* cited by examiner

*Primary Examiner*—Linh Van Nguyen
(74) *Attorney, Agent, or Firm*—Oblon, Spivak, McClelland, Maier & Neustadt, P.C.

(57) ABSTRACT

In a data arrangement of a CD-ROM format, data in which DSV control data cannot be placed due to a restriction on the format is followed by control data of two bytes. Main data in which any data cannot be placed is followed by a special control data sequence of two bytes. As a result, after a data sequence of which it is unknown whether the start bit is plus or minus, the sign of the start bit of a diverging control data sequence preceded by the special control data sequence can be kept constant. Consequently, DSV values can be deviated in one direction.

5 Claims, 24 Drawing Sheets

Fig. 2

| COMBINATION OF DSV DIFFUSION | | |
|---|---|---|
| 1, | 0x04 | 0xf9 |
| 2, | 0x65 | 0x9a |
| 3, | 0x98 | 0xb9 |
| 4, | 0x9a | 0xb9 |
| 5, | 0x9a | 0xf9 |

Fig. 3

| 0x00 | 0x04 | 0xf9 | 0x04 | 0xcc | 0x04 | 0xf9 | 0x04 | 0xf9 | 0x04 | 0xf9 | 0x04 | 0xf9 | 0x04 | 0xf9 |
| 0x40 | 0x04 | 0xf9 | 0x04 | 0xf9 | 0xff | 0xf9 | 0x04 | 0xf9 | 0x04 | 0xf9 | 0x04 | 0xf9 | 0x04 | 0xf9 |
| 0x40 | 0x04 | 0xf9 | 0x04 | 0xf9 | 0xff | 0xf9 | 0x04 | 0xf9 | 0x04 | 0xf9 | 0x04 | 0xf9 | 0x04 | 0xf9 |
| 0x00 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 |
| 0x00 | 0x04 | 0xf9 | 0x04 | 0xf9 | 0x04 | 0x74 | 0x04 | 0xf9 | 0x04 | 0xf9 | 0x04 | 0xf9 | 0x04 | 0xf9 |
| 0x40 | 0x04 | 0xf9 | 0x04 | 0xf9 | 0x04 | 0x00 | 0x04 | 0xf9 | 0x04 | 0xf9 | 0x04 | 0xf9 | 0x04 | 0xf9 |
| 0x40 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 |
| 0x00 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 |

Fig. 4

| MAIN DATA | 0x00 | 0x04 | 0xf9 | 0x04 | 0xf9 | 0x04 | 0xcc | 0x04 | 0xf9 | 0x04 | 0xf9 | 0x04 | 0x04 | 0xf9 | 0x04 | 0xf9 | 0x04 | 0xf9 | 0x04 | 0xf9 |
|---|---|---|---|---|---|---|---|---|---|---|---|---|---|---|---|---|---|---|---|---|
| DSV VALUE | 0 | 5 | 14 | 19 | 28 | 33 | 32 | 27 | 18 | 13 | 4 | -1 | -10 | -15 | -24 | -29 | -38 | -43 | -52 |

| MAIN DATA | 0x40 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 |
|---|---|---|---|---|---|---|---|---|---|---|---|---|---|---|---|---|---|---|---|
| DSV VALUE | -52 | -47 | -38 | -33 | -24 | -19 | -10 | -5 | 4 | 9 | 18 | 23 | 32 | 37 | 46 | 51 | 60 | 65 | 74 |

| MAIN DATA | 0x40 | 0x04 | 0xf9 | 0x04 | 0xf9 | 0x04 | 0xff | 0xf9 | 0x04 | 0xf9 | 0x04 | 0xf9 | 0x04 | 0xf9 | 0x04 | 0xf9 | 0x04 | 0xf9 | 0x04 | 0xf9 |
|---|---|---|---|---|---|---|---|---|---|---|---|---|---|---|---|---|---|---|---|---|
| DSV VALUE | 74 | 69 | 60 | 55 | 46 | 41 | 32 | 23 | 18 | 9 | 4 | -5 | -10 | -15 | -24 | -29 | -38 | -33 | -47 |

| MAIN DATA | 0x00 | 0x04 | 0xf9 | 0x04 | 0xf9 | 0x04 | 0xf9 | 0xff | 0xf9 | 0x04 | 0xf9 | 0x04 | 0xf9 | 0x04 | 0xf9 | 0x04 | 0xf9 | 0x04 | 0xf9 | 0x04 | 0xf9 |
|---|---|---|---|---|---|---|---|---|---|---|---|---|---|---|---|---|---|---|---|---|---|
| DSV VALUE | -47 | -42 | -33 | -28 | -19 | -14 | -5 | -5 | 4 | 9 | 18 | 23 | 32 | 37 | 46 | 51 | 60 | 65 | 74 |

| MAIN DATA | 0x00 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 |
|---|---|---|---|---|---|---|---|---|---|---|---|---|---|---|---|---|---|---|---|
| DSV VALUE | 74 | 69 | 60 | 55 | 46 | 41 | 32 | 27 | 18 | 13 | 4 | -1 | -10 | -15 | -24 | -29 | -38 | -43 | -52 |

| MAIN DATA | 0x40 | 0x04 | 0xf9 | 0x04 | 0xf9 | 0x04 | 0xf9 | 0x04 | 0x74 | 0x04 | 0xf9 | 0x04 | 0xf9 | 0x04 | 0xf9 | 0x04 | 0xf9 | 0x04 | 0xf9 |
|---|---|---|---|---|---|---|---|---|---|---|---|---|---|---|---|---|---|---|---|
| DSV VALUE | -52 | -47 | -38 | -33 | -24 | -19 | -10 | -5 | -5 | 0 | 9 | 14 | 23 | 28 | 37 | 42 | 51 | 56 | 65 |

| MAIN DATA | 0x40 | 0x04 | 0xf9 | 0x04 | 0xf9 | 0x04 | 0xf9 | 0x04 | 0x00 | 0x04 | 0xf9 | 0x04 | 0xf9 | 0x04 | 0xf9 | 0x04 | 0xf9 | 0x04 | 0xf9 |
|---|---|---|---|---|---|---|---|---|---|---|---|---|---|---|---|---|---|---|---|
| DSV VALUE | 65 | 60 | 51 | 46 | 37 | 32 | 23 | 18 | 18 | 13 | 4 | -1 | -10 | -15 | -24 | -29 | -38 | -43 | -52 |

| MAIN DATA | 0x00 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 | 0x04 | 0xf9 |
|---|---|---|---|---|---|---|---|---|---|---|---|---|---|---|---|---|---|---|---|
| DSV VALUE | -52 | -47 | -38 | -33 | -24 | -19 | -10 | -5 | 4 | 9 | 18 | 23 | 32 | 37 | 46 | 51 | 60 | 65 | 74 |

Fig. 6

| 0x00 | 0x85 | 0x93 | 0x04 | 0xf9 | 0x04 | 0x85 | 0x93 | 0x04 | 0xf9 | 0x04 | 0xf9 | 0x04 | 0xf9 | 0x04 | 0xf9 |
| 0x40 | 0x85 | 0x93 | 0x04 | 0xf9 | 0x04 | 0x04 | 0xf9 | 0x04 | 0xf9 | 0x04 | 0xf9 | 0x04 | 0xf9 | 0x04 | 0x04 |
| 0x40 | 0x85 | 0x93 | 0x04 | 0xf9 | 0xff | 0x85 | 0x04 | 0x93 | 0x04 | 0xf9 | 0x04 | 0xf9 | 0x04 | 0xf9 | 0x04 |
| 0x00 | 0x85 | 0x93 | 0x04 | 0xf9 | 0xff | 0x85 | 0x04 | 0x93 | 0x04 | 0xf9 | 0x04 | 0xf9 | 0x04 | 0xf9 | 0x04 |
| 0x00 | 0x85 | 0x93 | 0x04 | 0xf9 | 0x04 | 0xf9 | 0x04 | 0x04 | 0xf9 | 0x04 | 0xf9 | 0x04 | 0xf9 | 0x04 | 0xf9 |
| 0x40 | 0x85 | 0x93 | 0x04 | 0xf9 | 0x04 | 0x74 | 0x85 | 0x93 | 0x04 | 0xf9 | 0x04 | 0xf9 | 0x04 | 0xf9 | 0x04 |
| 0x40 | 0x85 | 0x93 | 0x04 | 0xf9 | 0x04 | 0x00 | 0x85 | 0x93 | 0x04 | 0x04 | 0xf9 | 0x04 | 0xf9 | 0x04 | 0xf9 |
| 0x00 | 0x85 | 0x93 | 0x04 | 0xf9 | 0x04 | 0xf9 | 0x04 | 0xf9 | 0x04 | 0x04 | 0xf9 | 0x04 | 0xf9 | 0x04 | 0xf9 |

Fig. 7

| MAIN DATA | 0x00 | 0x85 | 0x93 | 0x04 | 0xc0 | 0x85 | 0x93 | 0x04 | 0x04 | 0xf9 | 0x04 | 0x04 | 0xf9 | 0x04 | 0x04 | 0xf9 |
|---|---|---|---|---|---|---|---|---|---|---|---|---|---|---|---|---|
| DSV VALUE | 0 | 1 | 2 | 7 | 16 | 21 | 22 | 23 | 28 | 37 | 42 | 51 | 56 | 65 | 70 | 79 | 84 | 93 |

| MAIN DATA | 0x40 | 0x85 | 0x93 | 0x04 | 0xf9 | 0x04 | 0x04 | 0x04 | 0x04 | 0xf9 | 0x04 | 0xf9 | 0x04 | 0xf9 | 0x04 | 0x04 | 0xf9 |
|---|---|---|---|---|---|---|---|---|---|---|---|---|---|---|---|---|---|
| DSV VALUE | 93 | 98 | 107 | 112 | 121 | 126 | 135 | 140 | 149 | 154 | 163 | 168 | 177 | 182 | 191 | 196 | 205 | 210 | 219 |

| MAIN DATA | 0x40 | 0x85 | 0x93 | 0x04 | 0xf9 | 0x04 | 0xff | 0x85 | 0x93 | 0x04 | 0xf9 | 0xf9 | 0xf9 | 0xf9 | 0xf9 | 0xf9 | 0x04 | 0x04 |
|---|---|---|---|---|---|---|---|---|---|---|---|---|---|---|---|---|---|---|
| DSV VALUE | 219 | 224 | 233 | 238 | 247 | 252 | 261 | 261 | 262 | 263 | 268 | 277 | 282 | 291 | 296 | 305 | 310 | 319 | 324 |

| MAIN DATA | 0x00 | 0x85 | 0x93 | 0x04 | 0xf9 | 0x04 | 0xff | 0x85 | 0x93 | 0x04 | 0x04 | 0xf9 | 0xf9 | 0xf9 | 0xf9 | 0xf9 | 0x04 | 0x04 |
|---|---|---|---|---|---|---|---|---|---|---|---|---|---|---|---|---|---|---|
| DSV VALUE | 324 | 329 | 338 | 343 | 352 | 357 | 366 | 366 | 367 | 368 | 377 | 382 | 391 | 396 | 405 | 410 | 419 | 424 | 429 |

| MAIN DATA | 0x40 | 0x85 | 0x93 | 0x04 | 0xf9 | 0x04 | 0x04 | 0x04 | 0x04 | 0xf9 | 0x04 | 0xf9 | 0x04 | 0xf9 | 0x04 | 0x04 | 0xf9 |
|---|---|---|---|---|---|---|---|---|---|---|---|---|---|---|---|---|---|
| DSV VALUE | 429 | 434 | 443 | 448 | 457 | 462 | 471 | 476 | 485 | 490 | 499 | 504 | 513 | 518 | 527 | 532 | 541 | 546 | 555 |

| MAIN DATA | 0x40 | 0x85 | 0x93 | 0x04 | 0xf9 | 0x04 | 0x04 | 0x74 | 0x93 | 0x04 | 0x04 | 0xf9 | 0x04 | 0xf9 | 0x04 | 0xf9 | 0x04 | 0xf9 |
|---|---|---|---|---|---|---|---|---|---|---|---|---|---|---|---|---|---|---|
| DSV VALUE | 555 | 560 | 569 | 574 | 583 | 588 | 597 | 602 | 602 | 603 | 604 | 609 | 618 | 623 | 632 | 637 | 646 | 651 | 660 |

| MAIN DATA | 0x40 | 0x85 | 0x93 | 0x04 | 0xf9 | 0x04 | 0xf9 | 0x00 | 0x85 | 0x93 | 0x04 | 0x04 | 0xf9 | 0x04 | 0xf9 | 0x04 | 0x04 | 0xf9 |
|---|---|---|---|---|---|---|---|---|---|---|---|---|---|---|---|---|---|---|
| DSV VALUE | 660 | 665 | 674 | 679 | 688 | 693 | 697 | 697 | 698 | 699 | 704 | 713 | 718 | 727 | 732 | 741 | 746 | 755 |

| MAIN DATA | 0x40 | 0x85 | 0x93 | 0x04 | 0xf9 | 0x04 | 0xf9 | 0x04 | 0x04 | 0xf9 | 0x04 | 0xf9 | 0xf9 | 0x04 | 0xf9 | 0x04 | 0x04 | 0xf9 |
|---|---|---|---|---|---|---|---|---|---|---|---|---|---|---|---|---|---|---|
| DSV VALUE | 755 | 760 | 769 | 774 | 783 | 788 | 797 | 802 | 811 | 816 | 825 | 830 | 839 | 844 | 853 | 858 | 867 | 872 | 881 |

Fig. 9A

| MAIN DATA | 0x04 | Merging | 0xb9 | Merging | 0x04 |
|---|---|---|---|---|---|
| 14-BIT DATA | 01000100000000 | 001 | 10000000001001 | 000 | 01000100000000 |

DSV VALUE  1 0 0 0 0 1 1 1 1 1 1 1 0 0 0 1 1 1 1 1 1 1 1 0 0 0 0 1 1 1 1 1 1 1 1

Fig. 9B

| MAIN DATA | 0x85 | Merging | 0x93 | Merging | 0x04 |
|---|---|---|---|---|---|
| 14-BIT DATA | 00000001000001 | 000 | 00100010000001 | 000 | 01000100000000 |

DSV VALUE  0 0 0 0 0 0 0 1 1 1 1 1 1 1 0 0 0 0 0 0 1 1 1 1 1 0 0 0 0 1 1 1 1 1 1 1

Fig. 9C

| MAIN DATA | 0x85 | Merging | 0x93 | Merging | 0x04 |
|---|---|---|---|---|---|
| 14-BIT DATA | 00000001000001 | 001 | 00100010000001 | 000 | 01000100000000 |

DSV VALUE  1 1 1 1 1 1 1 0 0 0 0 0 0 1 1 1 0 0 0 0 1 1 1 1 1 0 0 0 0 1 1 1 1 1 1 1

Fig. 10

| MAIN DATA | 0x00 | 0x85 | 0x93 | 0x04 | 0xf9 | 0x04 | 0xcc | 0x85 | 0x93 | 0x04 | 0xf9 | 0x04 | 0xf9 | 0x04 | 0xf9 | 0x04 | 0xf9 |
| --- | --- | --- | --- | --- | --- | --- | --- | --- | --- | --- | --- | --- | --- | --- | --- | --- | --- |
| DSV VALUE | 0 | 1 | 2 | 7 | 16 | 21 | 21 | 22 | 23 | 28 | 37 | 42 | 51 | 56 | 65 | 70 | 79 | 84 | 93 |

| MAIN DATA | 0x40 | 0x85 | 0x93 | 0x04 | 0xf9 | 0x04 | | | | 0x04 | 0xf9 | 0x04 | 0xf9 | 0x04 | 0xf9 | 0x04 | 0xf9 |
| --- | --- | --- | --- | --- | --- | --- | --- | --- | --- | --- | --- | --- | --- | --- | --- | --- | --- |
| DSV VALUE | 93 | 94 | 95 | 100 | 109 | 114 | 123 | 128 | 137 | 142 | 151 | 156 | 165 | 170 | 179 | 184 | 193 | 198 | 207 |

| MAIN DATA | 0x40 | 0x85 | 0x93 | 0x04 | 0xf9 | 0x04 | 0xff | 0x85 | 0x04 | 0x04 | 0xf9 | 0x04 | 0xf9 | 0x04 | 0xf9 | 0x04 | 0xf9 |
| --- | --- | --- | --- | --- | --- | --- | --- | --- | --- | --- | --- | --- | --- | --- | --- | --- | --- |
| DSV VALUE | 207 | 206 | 205 | 200 | 191 | 186 | 177 | 177 | 176 | 175 | 170 | 161 | 156 | 147 | 142 | 133 | 128 | 119 | 114 |

| MAIN DATA | 0x00 | 0x85 | 0x93 | 0x04 | 0xf9 | 0x04 | 0xf9 | 0xff | 0x85 | 0x93 | 0x04 | 0x04 | 0xf9 | 0x04 | 0xf9 | 0x04 | 0xf9 |
| --- | --- | --- | --- | --- | --- | --- | --- | --- | --- | --- | --- | --- | --- | --- | --- | --- | --- |
| DSV VALUE | 114 | 115 | 116 | 121 | 130 | 135 | 144 | 144 | 143 | 142 | 137 | 128 | 123 | 114 | 109 | 100 | 95 | 86 | 81 |

| MAIN DATA | 0x00 | 0x85 | 0x93 | 0x04 | 0xf9 | 0x04 | 0xf9 | | | 0x04 | 0xf9 | 0x04 | 0xf9 | 0x04 | 0xf9 | 0x04 | 0xf9 |
| --- | --- | --- | --- | --- | --- | --- | --- | --- | --- | --- | --- | --- | --- | --- | --- | --- | --- |
| DSV VALUE | 81 | 82 | 83 | 88 | 97 | 102 | 111 | 116 | 125 | 130 | 139 | 144 | 153 | 158 | 167 | 172 | 181 | 186 | 195 |

| MAIN DATA | 0x40 | 0x85 | 0x93 | 0x04 | 0xf9 | 0x04 | 0xf9 | 0x74 | 0x85 | 0x93 | 0x04 | 0x04 | 0xf9 | 0x04 | 0xf9 | 0x04 | 0xf9 |
| --- | --- | --- | --- | --- | --- | --- | --- | --- | --- | --- | --- | --- | --- | --- | --- | --- | --- |
| DSV VALUE | 195 | 194 | 193 | 188 | 179 | 174 | 165 | 160 | 159 | 158 | 153 | 144 | 139 | 130 | 125 | 116 | 111 | 102 |

| MAIN DATA | 0x40 | 0x85 | 0x93 | 0x04 | 0xf9 | 0x04 | 0xf9 | 0x00 | 0x00 | 0x93 | 0x04 | 0xf9 | 0x04 | 0xf9 | 0x04 | 0xf9 | 0x04 | 0xf9 |
| --- | --- | --- | --- | --- | --- | --- | --- | --- | --- | --- | --- | --- | --- | --- | --- | --- | --- | --- |
| DSV VALUE | 102 | 103 | 104 | 109 | 118 | 123 | 132 | 137 | 137 | 136 | 135 | 130 | 121 | 116 | 107 | 102 | 93 | 88 | 79 |

| MAIN DATA | 0x00 | 0x85 | 0x93 | 0x04 | 0xf9 | 0x04 | 0xf9 | 0xf9 | 0xf9 | 0xf9 | 0xf9 | 0x04 | 0x04 | 0xf9 | 0x04 | 0xf9 | 0x04 | 0xf9 |
| --- | --- | --- | --- | --- | --- | --- | --- | --- | --- | --- | --- | --- | --- | --- | --- | --- | --- | --- |
| DSV VALUE | 79 | 80 | 81 | 86 | 95 | 100 | 109 | 114 | 123 | 128 | 137 | 142 | 151 | 156 | 165 | 170 | 179 | 184 | 193 |

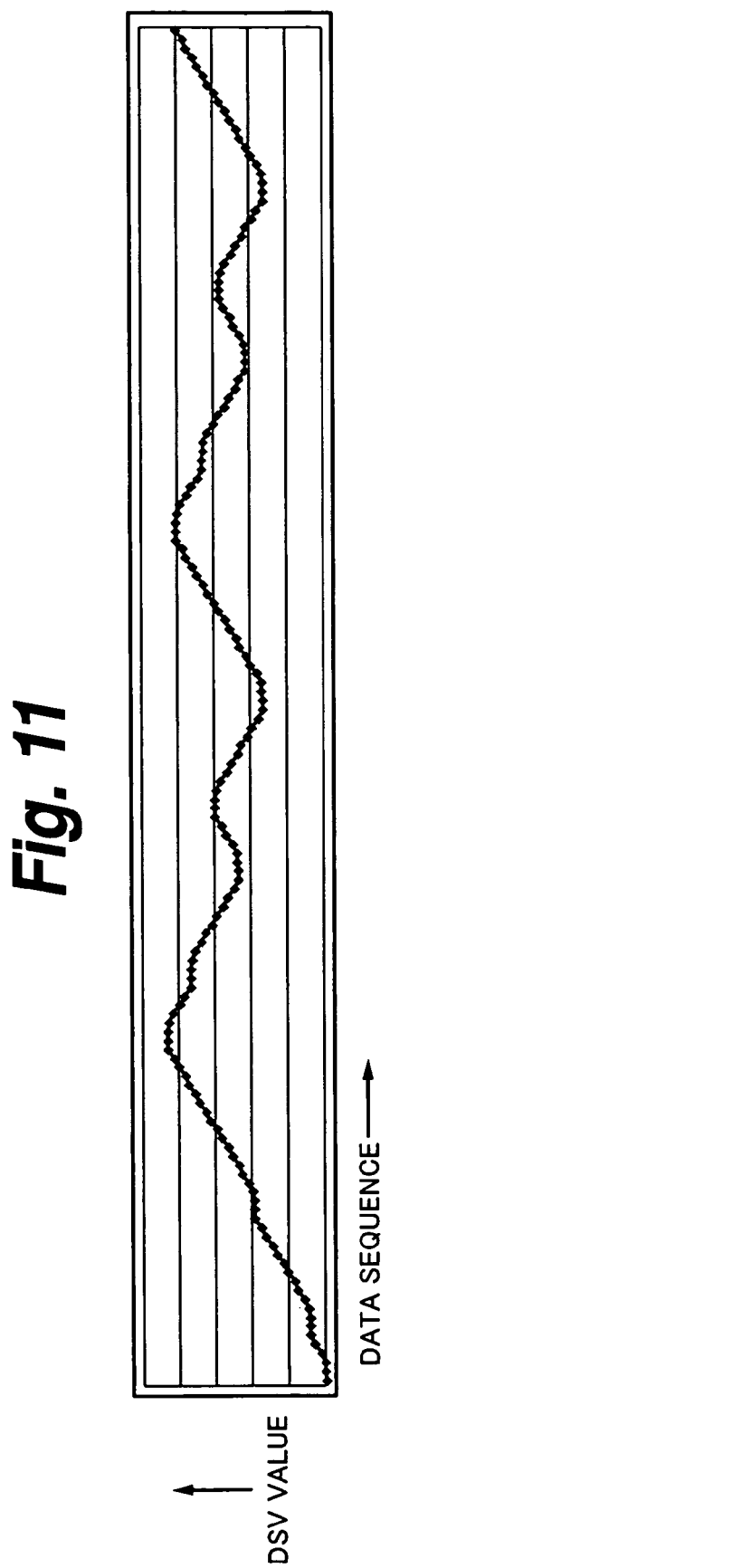

Fig. 12A

| MAIN DATA | 0x85 | Merging | 0x93 | Merging | 0x04 |
|---|---|---|---|---|---|
| 14-BIT DATA | 00000000100001 | 001 | 00100000100001 | 000 | 10001000000000 |

DSV VALUE  0 0 0 0 0 0 0 0 1 1 1 1 0 0 0 1 1 1 0 0 0 0 0 1 1 1 1 0 0 0 0 0 0 0 0 0

Fig. 12B

| MAIN DATA | 0x85 | Merging | 0x93 | Merging | 0x04 |
|---|---|---|---|---|---|
| 14-BIT DATA | 00000000100001 | 000 | 00100000100001 | 000 | 10001000000000 |

DSV VALUE  1 1 1 1 1 1 1 0 0 0 0 1 1 1 1 0 0 0 1 1 1 0 0 0 0 0 1 1 1 1 0 0 0 0 0 0

Fig. 13

| MAIN DATA | 0x00 | 0x85 | 0x93 | 0x04 | 0xf9 | 0x04 | 0xcc | 0x85 | 0x93 | 0x04 | 0x04 | 0x93 | 0x04 | 0x04 | 0xf9 | 0x04 | 0x04 | 0x04 | 0xf9 | 0x04 | 0x04 |
|---|---|---|---|---|---|---|---|---|---|---|---|---|---|---|---|---|---|---|---|---|---|
| DSV VALUE | 0 | 1 | 2 | 7 | 16 | 21 | 21 | 22 | 23 | 28 | 37 | 42 | 51 | 56 | 65 | 70 | 79 | 84 | 93 |
| COUNTER VALUE | 0 | 1 | 2 | 7 | 16 | 21 | 21 | 22 | 23 | 28 | 37 | 42 | 51 | 56 | 65 | 70 | 79 | 84 | 93 |

| MAIN DATA | 0x40 | 0x85 | 0x93 | 0x04 | 0xf9 | 0x04 | 0xf9 | 0x04 | 0x04 | 0x04 | 0x04 | 0x04 | 0x04 | 0x04 | 0xf9 | 0x04 | 0x04 | 0x04 | 0x04 |
|---|---|---|---|---|---|---|---|---|---|---|---|---|---|---|---|---|---|---|---|
| DSV VALUE | 93 | 94 | 95 | 100 | 109 | 114 | 123 | 128 | 137 | 142 | 151 | 156 | 165 | 170 | 179 | 184 | 193 | 198 | 207 |
| COUNTER VALUE | 93 | 94 | 95 | 100 | 109 | 114 | 123 | 128 | 137 | 142 | 151 | 156 | 165 | 170 | 179 | 184 | 193 | 198 | −49 |

| MAIN DATA | 0x40 | 0x85 | 0x93 | 0x04 | 0xf9 | 0x04 | 0xff | 0x85 | 0x93 | 0x04 | 0x04 | 0x93 | 0x04 | 0x04 | 0xf9 | 0x04 | 0x04 | 0x04 | 0xf9 |
|---|---|---|---|---|---|---|---|---|---|---|---|---|---|---|---|---|---|---|---|
| DSV VALUE | 195 | 206 | 205 | 200 | 191 | 186 | 177 | 177 | 176 | 175 | 170 | 161 | 156 | 147 | 142 | 133 | 128 | 119 | 114 |
| COUNTER VALUE | −61 | −50 | −51 | −56 | −65 | −70 | −79 | −79 | −80 | −81 | −86 | −95 | −100 | −109 | −114 | −123 | −128 | −137 | −142 |

| MAIN DATA | 0x00 | 0x85 | 0x93 | 0x04 | 0xf9 | 0x04 | 0x04 | 0x04 | 0x93 | 0x04 | 0x04 | 0x04 | 0x04 | 0x04 | 0xf9 | 0x04 | 0x04 | 0x04 | 0x04 |
|---|---|---|---|---|---|---|---|---|---|---|---|---|---|---|---|---|---|---|---|
| DSV VALUE | 114 | 115 | 116 | 121 | 130 | 135 | 144 | 144 | 143 | 142 | 137 | 128 | 123 | 114 | 109 | 100 | 95 | 86 | 81 |
| COUNTER VALUE | 114 | 115 | 116 | 121 | 130 | 135 | −121 | −112 | −113 | −114 | −119 | −128 | −133 | −142 | −147 | −156 | −161 | −170 | −175 |

| MAIN DATA | 0x00 | 0x85 | 0x93 | 0x04 | 0xf9 | 0x04 | 0x04 | 0x04 | 0x85 | 0x93 | 0x04 | 0x04 | 0x04 | 0x04 | 0xf9 | 0x04 | 0x04 | 0x04 | 0xf9 |
|---|---|---|---|---|---|---|---|---|---|---|---|---|---|---|---|---|---|---|---|
| DSV VALUE | 81 | 82 | 83 | 88 | 97 | 102 | 111 | 116 | 125 | 125 | 130 | 139 | 144 | 153 | 158 | 167 | 172 | 181 | 186 |
| COUNTER VALUE | 81 | 82 | 83 | 88 | 97 | 102 | 111 | 116 | 125 | 125 | −126 | −117 | −112 | −103 | −98 | −89 | −84 | −75 | −70 |

| MAIN DATA | 0x40 | 0x85 | 0x93 | 0x04 | 0xf9 | 0x04 | 0x04 | 0x04 | 0x00 | 0x93 | 0x04 | 0x04 | 0x04 | 0x04 | 0x93 | 0x04 | 0x04 | 0x04 | 0x04 |
|---|---|---|---|---|---|---|---|---|---|---|---|---|---|---|---|---|---|---|---|
| DSV VALUE | 195 | 194 | 193 | 188 | 179 | 174 | 165 | 160 | 159 | 158 | 153 | 144 | 139 | 130 | 135 | 136 | 137 | 130 | 125 |
| COUNTER VALUE | −61 | −62 | −63 | −68 | −77 | −82 | −91 | −96 | −97 | −98 | −103 | −112 | −117 | −126 | −117 | −118 | −119 | −84 | −75 |

| MAIN DATA | 0x40 | 0x85 | 0x93 | 0x04 | 0xf9 | 0x04 | 0x04 | 0x04 | 0x04 | 0x04 | 0x04 | 0x04 | 0x04 | 0x04 | 0xf9 | 0x04 | 0x04 | 0x04 | 0xf9 |
|---|---|---|---|---|---|---|---|---|---|---|---|---|---|---|---|---|---|---|---|
| DSV VALUE | 102 | 103 | 104 | 109 | 118 | 123 | 132 | 137 | 137 | 136 | 135 | 130 | 121 | 116 | 107 | 102 | 93 | 88 | 79 |
| COUNTER VALUE | 102 | 103 | 104 | 109 | 118 | 123 | −124 | −119 | −119 | −118 | −117 | −112 | −121 | −126 | −117 | −112 | −103 | −98 | −89 |

| MAIN DATA | 0x00 | 0x85 | 0x93 | 0x04 | 0xf9 | 0x04 | 0x04 | 0x04 | 0x04 | 0x04 | 0x04 | 0x04 | 0x04 | 0x04 | 0xf9 | 0x04 | 0x04 | 0x04 | 0xf9 |
|---|---|---|---|---|---|---|---|---|---|---|---|---|---|---|---|---|---|---|---|
| DSV VALUE | 79 | 80 | 81 | 86 | 95 | 100 | 109 | 114 | 114 | 128 | 128 | 137 | 142 | 151 | 156 | 165 | 170 | 179 | 184 |
| COUNTER VALUE | 79 | 80 | 81 | 86 | 95 | 100 | 109 | 114 | 114 | 128 | 128 | −119 | −114 | −105 | −100 | −91 | −86 | −77 | −72 |

| MAIN DATA | 0x00 | 0x85 | 0x93 | 0xb9 | 0x98 | 0xb9 | 0x98 | 0xb9 | 0x98 | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|
| DSV VALUE | 0 | 1 | 2 | 7 | 16 | 21 | 30 | 35 | 44 | 49 | 58 | 63 | 72 | 77 | 86 | 91 | 100 | 105 | 114 |

| MAIN DATA | 0x40 | 0x85 | 0x93 | 0xb9 | 0x98 | 0xb9 | 0x98 | 0xb9 | 0x98 | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|
| DSV VALUE | 114 | 119 | 128 | 133 | 142 | 147 | 156 | 161 | 170 | 175 | 184 | 189 | 198 | 203 | 212 | 217 | 226 | 231 | 240 |

| MAIN DATA | 0x40 | 0x85 | 0x93 | 0xb9 | 0x98 | 0xb9 | 0x98 | 0xb9 | 0x98 | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|
| DSV VALUE | 240 | 245 | 254 | 259 | 268 | 273 | 282 | 287 | 296 | 301 | 310 | 315 | 324 | 329 | 338 | 343 | 352 | 357 | 366 |

| MAIN DATA | 0x00 | 0x85 | 0x93 | 0xb9 | 0x98 | 0xb9 | 0x98 | 0xb9 | 0x98 | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|
| DSV VALUE | 366 | 371 | 380 | 385 | 394 | 399 | 408 | 413 | 422 | 427 | 436 | 441 | 450 | 455 | 464 | 469 | 478 | 483 | 492 |

| MAIN DATA | 0x00 | 0x85 | 0x93 | 0xb9 | 0x98 | 0xb9 | 0x98 | 0xb9 | 0x98 | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|
| DSV VALUE | 492 | 497 | 506 | 511 | 520 | 525 | 534 | 539 | 548 | 553 | 562 | 567 | 576 | 581 | 590 | 595 | 604 | 609 | 618 |

| MAIN DATA | 0x40 | 0x85 | 0x93 | 0xb9 | 0x98 | 0xb9 | 0x98 | 0xb9 | 0x98 | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|
| DSV VALUE | 618 | 623 | 632 | 637 | 646 | 651 | 660 | 665 | 674 | 679 | 688 | 693 | 702 | 707 | 716 | 721 | 730 | 735 | 744 |

| MAIN DATA | 0x40 | 0x85 | 0x93 | 0xb9 | 0x98 | 0xb9 | 0x98 | 0xb9 | 0x98 | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|
| DSV VALUE | 744 | 749 | 758 | 763 | 772 | 777 | 786 | 791 | 800 | 805 | 814 | 819 | 828 | 833 | 842 | 847 | 856 | 861 | 870 |

| MAIN DATA | 0x00 | 0x85 | 0x93 | 0xb9 | 0x98 | 0xb9 | 0x98 | 0xb9 | 0x98 | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|
| DSV VALUE | 870 | 875 | 884 | 889 | 898 | 903 | 912 | 917 | 926 | 931 | 940 | 945 | 954 | 959 | 968 | 973 | 982 | 987 | 996 |

Fig. 18

| MAIN DATA | 0x00 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 0 | 1 | 2 | 7 | 16 | 21 | 30 | 35 | 44 | 49 | 50 | 55 | 64 | 69 | 78 | 83 | 92 | 97 | 106 |

| MAIN DATA | 0x40 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 106 | 111 | 120 | 125 | 134 | 139 | 148 | 153 | 162 | 167 | 168 | 173 | 182 | 187 | 196 | 201 | 210 | 215 | 224 |

| MAIN DATA | 0x40 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 224 | 229 | 238 | 243 | 252 | 257 | 266 | 271 | 280 | 285 | 286 | 291 | 300 | 305 | 314 | 319 | 328 | 333 | 342 |

| MAIN DATA | 0x00 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 342 | 347 | 356 | 361 | 370 | 375 | 384 | 389 | 398 | 403 | 404 | 409 | 418 | 423 | 432 | 437 | 446 | 451 | 460 |

| MAIN DATA | 0x40 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 460 | 465 | 474 | 479 | 488 | 493 | 502 | 507 | 516 | 521 | 522 | 527 | 536 | 541 | 550 | 555 | 564 | 569 | 578 |

| MAIN DATA | 0x00 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 578 | 583 | 592 | 597 | 606 | 611 | 620 | 625 | 634 | 639 | 640 | 645 | 654 | 659 | 668 | 673 | 682 | 687 | 696 |

| MAIN DATA | 0x40 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 696 | 701 | 710 | 715 | 724 | 729 | 738 | 743 | 752 | 757 | 758 | 763 | 772 | 777 | 786 | 791 | 800 | 805 | 814 |

| MAIN DATA | 0x40 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 814 | 819 | 828 | 833 | 842 | 847 | 856 | 861 | 870 | 875 | 876 | 881 | 890 | 895 | 904 | 909 | 918 | 923 | 932 |

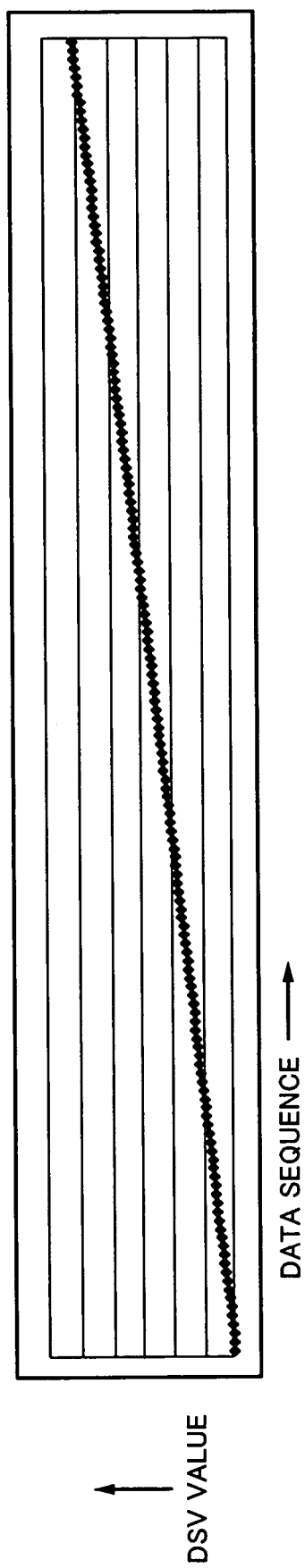

Fig. 20

| MAIN DATA | 0x00 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 |
|---|---|---|---|---|---|---|---|---|---|---|---|---|---|---|---|---|---|---|
| DSV VALUE | 0 | 3 | 6 | 11 | 20 | 25 | 34 | 39 | 48 | 53 | 56 | 51 | 42 | 37 | 28 | 23 | 14 | 9 |

| MAIN DATA | 0x40 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 0 | 3 | 6 | 11 | 20 | 25 | 34 | 39 | 48 | 53 | 56 | 51 | 42 | 37 | 28 | 23 | 14 | 9 | 0 |

| MAIN DATA | 0x40 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 0 | 3 | 6 | 11 | 20 | 25 | 34 | 39 | 48 | 53 | 56 | 51 | 42 | 37 | 28 | 23 | 14 | 9 | 0 |

| MAIN DATA | 0x00 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 0 | 3 | 6 | 11 | 20 | 25 | 34 | 39 | 48 | 53 | 56 | 51 | 42 | 37 | 28 | 23 | 14 | 9 | 0 |

| MAIN DATA | 0x00 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 0 | 3 | 6 | 11 | 20 | 25 | 34 | 39 | 48 | 53 | 56 | 51 | 42 | 37 | 28 | 23 | 14 | 9 | 0 |

| MAIN DATA | 0x40 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 0 | 3 | 6 | 11 | 20 | 25 | 34 | 39 | 48 | 53 | 56 | 51 | 42 | 37 | 28 | 23 | 14 | 9 | 0 |

| MAIN DATA | 0x40 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 0 | 3 | 6 | 11 | 20 | 25 | 34 | 39 | 48 | 53 | 56 | 51 | 42 | 37 | 28 | 23 | 14 | 9 | 0 |

| MAIN DATA | 0x00 | 0x85 | 0x93 | 0xb9 | 0x98 | 0xb9 | 0x98 | 0xb9 | 0x98 | 0xb9 | 0xdf | 0xb9 | 0x98 | 0xb9 | 0x98 | 0xb9 | 0x98 | 0xb9 | 0x98 |
|---|---|---|---|---|---|---|---|---|---|---|---|---|---|---|---|---|---|---|---|
| DSV VALUE | 0 | 3 | 6 | 11 | 20 | 25 | 34 | 39 | 48 | 53 | 56 | 51 | 42 | 37 | 28 | 23 | 14 | 9 | 0 |

Fig. 22A

| MAIN DATA | 0xb9 | Merging | 0x98 | Merging | 0xb9 |
|---|---|---|---|---|---|
| 14-BIT DATA | 10000000100100 | 1000 | 01000000001111111100001 | 1000 | 10000000001 |

DSV VALUE   1 1 1 1 1 1 1 1 0 0 0 0 1 1 1 1 1 1 1 0 0 0 1

Fig. 22B

| MAIN DATA | 0xb9 | Merging | 0xdf | Merging | 0xb9 |
|---|---|---|---|---|---|
| 14-BIT DATA | 10000000100100 | 1000 | 00100000001000011110000 | 1000 | 10000000001 |

DSV VALUE   1 1 1 1 1 1 1 0 0 0 1 1 1 1 1 1 1 0 0 0 1

Fig. 22C

| MAIN DATA | 0xb9 | Merging | 0xdf | Merging | 0xb9 |
|---|---|---|---|---|---|
| 14-BIT DATA | 10000000100100 | 1001 | 00100000001000011110000 | 1001 | 00000000010 |

DSV VALUE   1 1 1 1 1 1 0 0 0 0 1 1 1 1 0 0 0 0 0 0 1 1 1 0

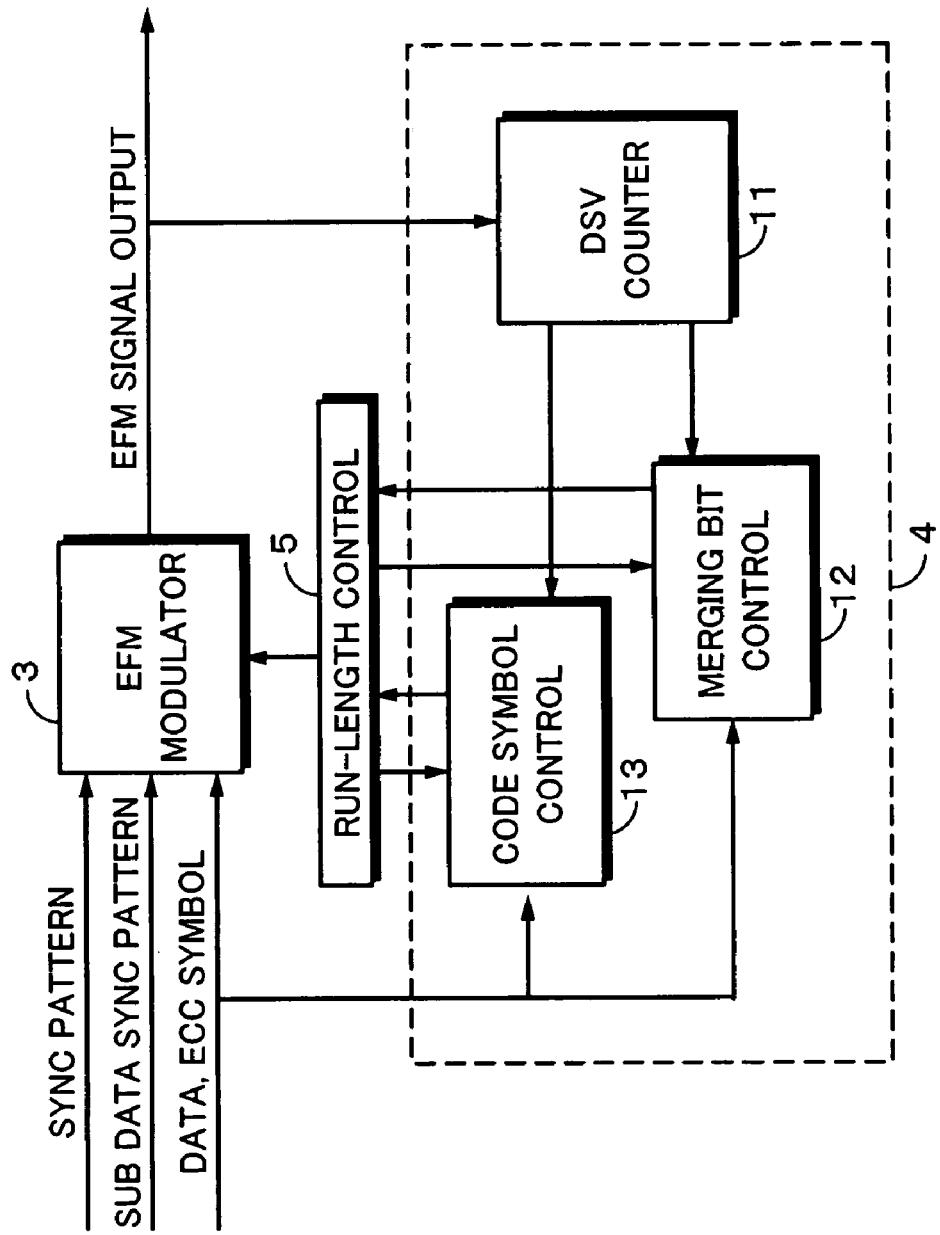

DATA RECORDING METHOD

BACKGROUND OF THE INVENTION

1. Field of the Invention

The present invention relates to a data recording method applied to an optical disc that uses EFM modulation.

2. Description of the Related Art

Since optical discs such as a compact disc digital audio (CD-DA) disc and a compact disc read only memory (CD-ROM) are easy to handle and produced at relatively low cost, they have been widely used as recording mediums that store data. In recent years, a compact disc recordable (CD-R) disc and a compact disc rewritable (CD-RW) disc have come out. Data can be easily recorded to such discs. Thus, optical discs in accordance with the CD standard such as a CD-DA disc, a CD-ROM disc, a CD-R disc, and a CD-RW disc are becoming the main stream of data recording mediums. In addition, in recent years, using MPEG1 Audio Layer-3 (MP3) and adaptive transform acoustic coding (ATRAC), audio data is compressed and recorded on a CD-ROM disc, a CD-R disc, a CD-RW disc, or the like.

However, as the CD-R disc and CD-RW disc have come out, data recorded on a CD can be easily copied. Thus, a problem about copyright protection arises. When content data of a CD is recoded, countermeasures are required to protect content data.

FIG. 1 shows an outline of a flow of a copy operation. A reproducing apparatus represented by reference numeral 21 reproduces content data from an original disc for example a CD 22. Reference numeral 23 represents an optical pickup. Reference numeral 24 represents a reproduction signal process portion. Reproduction data is supplied from the reproducing apparatus 21 to a recording process portion 32 of a recording apparatus 31. An optical pickup 33 records the reproduction data on an optical disc for example a CD-R 34. Recorded contents of the original CD 22 are copied to the CD-R 34. Thus, using the reproducing apparatus 21 and the recording apparatus 31, a copy disc of the original CD 22 can be easily produced.

In a CD, to decrease a DC component of a digital signal that is recorded, eight-to-fourteen modulation (EFM) is used. In the EFM, each data symbol of eight data bits is converted into a code symbol of 14 channel bits and merging bits of three bits are added at a boundary of two sequences of 14 channel bits.

A method for prohibiting digital information recorded on a disc from being copied in accordance with a characteristic of a digital modulation system such as EFM is disclosed in the following patent related art reference 1. In the patent related art reference 1, a special encoder and a standard encoder are used. In the standard encoder, digital sum variation (DSV) values cumulate in one direction. In contrast, in the special encoder, DSV values are prevented from cumulating. When the standard encoder re-encodes a predetermined data sequence, DSV values diverge. As a result, digital information cannot be normally reproduced. Thus, digital information can be prevented from being copied.

Patent Related Art Reference 1

Japanese Patent Laid-Open Publication No. HEI 9-288864

As described above, with a particular data sequence (referred to as DSV control data), DSV values are deviated in the plus direction or the minus direction. As a result, it becomes difficult or impossible to read contents from the disc. Consequently, copy detection and copy protection can be performed. However, actually, due to several causes, the expected objective for copy detection and copy protection cannot be accomplished.

As a first problem, in a synchronous pattern that represents the start position of an EFM frame and a sub code region for a sub code, the DSV control data cannot be placed in accordance with the format of a recording medium such as a CD. Even if DSV values are deviated in the plus direction or the minus direction, after data in which a DSV control data sequence cannot be placed, the logic of the EFM encoder causes the DSV values to be kept around zero. As a result, after such data, the DSV values are inversely deviated. As a result, the DSV values zigzag vary in a saw tooth wave shape. Thus, since the read drive or the like recognizes the average value of which the DSV values zigzag vary as DSV values, it treats the average value of the DSV values as 0. Consequently, the DSV values do not sufficiently deviate so that read disability takes place. As a result, the desired objective of which read disability takes place due to deviation of DSV values cannot be accomplished.

As a second problem, depending on the internal controlling method of a CD-R drive that produces a copy disc using a drive for a CD-R or the like, the DSV values may not be diverged. This is because the DSV controlling method of an IC that performs the encoding process such as EFM depends on the drive. Mainly, such a situation of which DSV values do not diverge takes place depending on the DSV counter length and the operation in the case that a DSV value of the disc exceeds the upper limit of the DSV counter.

When a DSV value of data reproduced from a disc reaches the upper limit of the DSV counter, mainly two types of operations are performed. In the first type, a limiter is added to the DSV counter. With the limiter, an upper limit value of a plus value or a minus value is held (hereinafter this type is referred to as limiter type). In the second type, when the value of the DSV counter exceeds the upper limit, the counter value becomes a minus value (hereinafter this type is referred to as overflow type). When the memory that stores a numeric value of an arithmetic operation of a computer has an upper limit, the most significant bit is generally used as a symbol of a minus value.

For example, an eight-bit counter can count up values from (0x00) (where 0x represents hexadecimal notation) to (0xff). The counter uses a code of 2's complement to express plus and minus values. In other words, values from (0x00) to (0x7f) are treated as plus values. Values from (0xff) to (0x80) are treated as minus values. (0xff) represents −1. Thus, (0x80) of which 1 is added to (0x7f) (+127 in decimal notation) that is the upper limit value is a minus value −128, not +128.

In the limiter type, since DSV values are simply deviated in the plus direction or minus direction, if a data sequence in which DSV values cannot be controlled due to a restriction on the format is followed or preceded by a special data sequence, the DSV values can be deviated. However, in the overflow type, even if a special data sequence is placed, when a DSV value of the encoder overflows, the sign of the DSV value is inverted. As a result, DSV values vary zigzag in a saw tooth wave shape. Thus, since the read drive recognizes the average value of DSV values as DSV values, it treats the DSV values as 0. Consequently, since DSV values do not sufficiently deviate or diverge, read disability does not take place. As a result, copy detection and copy protection cannot be sufficiently performed due to deviation of DSV values.

In addition, as described above, if DSV values are deviated in the plus direction or minus direction, it becomes difficult or impossible for the drive to read data from a disc so as to perform copy detection or copy protection. In this case, even in an original disc, DSV values inevitably deviate. As a result, an original disc from which contents can be prevented from being copied cannot be produced.

OBJECTS AND SUMMARY OF THE INVENTION

Thus, a first object of the present invention is to provide a data recording method that allows DSV values to deviate even if DSV control data that causes the DSV values to deviate cannot be placed due to a restriction on the format of an optical disc.

A second object of the present invention is to provide a data recording method that allows DSV values to securely deviate in the plus direction or minus direction even if the DSV counter of the encoder of the drive is of overflow type.

A third object of the present invention is to provide a data recording method that allows an original disc from which data can be prevented from being copied to be produced.

To solve the foregoing problem, an aspect of the present invention is a data recording method for recording digital data in accordance with a digital modulation system for converting a data symbol having a first predetermined number of bits into a code symbol having a second predetermined number of bits that is larger than the first predetermined number of bits and placing merging bits between code symbols so as to generate record data whose run length is restricted, the method comprising the steps of: recording DSV control data that causes DSV values to deviate in a plus direction or a minus direction and read disability of data that is reproduced to take place in at least part of a recording region; placing special control data of two symbols of more after data in which the DSV control data cannot be recorded due to a restriction on a data format of a recording medium; and causing the start bit of a code symbol of the DSV control data immediately preceded by the special control data to be fixed to "0" or "1" regardless of whether the value at the beginning of the code symbol of the special control data is "0" or "1" so as to deviate the DSV values in the plus direction or minus direction.

Another aspect of the present invention is the data recording method further comprising the steps of: pre-obtaining a position at which an apparent DSV value that a DSV counter outputs becomes minus when the digital modulation causes the DSV counter to overflow; and placing other special control data that is different from the special control data that causes DSV values of the next data sequence to deviate in the plus direction at the obtained position where the DSV value is minus so as to deviate DSV values in the plus or minus direction.

Another aspect of the present invention is a data recording method for recording digital data in accordance with a digital modulation system for converting a data symbol having a first predetermined number of bits into a code symbol having a second predetermined number of bits that is larger than the first predetermined number of bits and placing merging bits between code symbols so as to generate record data whose run length is restricted, the method comprising the steps of: recording DSV control data that causes DSV values to deviate in a plus direction or a minus direction and read disability of data that is reproduced to take place in at least part of a recording region; placing first special control data of two symbols of more after data in which the DSV control data cannot be recorded due to a restriction on a data format of a recording medium; placing second special control data that is different from the first special control data in the DSV control data; causing the first special control data to set the start bit of a code symbol of the DSV control data immediately preceded by the first special control data to "0" or "1" regardless of whether the value at the beginning of the code symbol of the first special control data is "0" or "1" so as to deviate the DSV values in the plus direction or minus direction; and causing the second special control data to set the start bit of the code symbol of the DSV control data immediately preceded by the second special control data to "0" or "1" that is different from the start bit that is set by the first special control data so as to deviate the DSV values in the plus direction or minus direction that is different from the direction that is set by the first special control data.

According to an aspect of the present invention, even if there is data in which DSV control data cannot be placed in accordance with the prescription of the data format of the recording medium, when the data is immediately followed by special control data of two bytes of more, DSV values can be deviated or diverged.

According to another aspect of the present invention, even if the DSV counter overflows and an apparent DSV value of the DSV counter becomes minus, with another special control data, DSV values can be deviated or diverged.

According to another aspect of the present invention, with second special control data, DSV values can be zigzag varied. As a result, data can be recorded so that read disability does not take place in data that is reproduced.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a schematic diagram showing several examples of DSV control data according to the present invention;

FIG. 3 is a schematic diagram showing an example of an arrangement of DSV control data on a recording medium;

FIG. 4 is a schematic diagram showing DSV values as an example of a data arrangement;

FIG. 6 is a schematic diagram showing a data arrangement according to a first embodiment of the present invention;

FIG. 7 is a schematic diagram showing DSV values of a data arrangement according to the first embodiment of the present invention;

FIG. 9A, FIG. 9B, and FIG. 9C are schematic diagrams describing the first embodiment of the present invention;

FIG. 10 is a schematic diagram showing DSV values describing a second embodiment of the present invention;

FIG. 11 is a schematic diagram showing DSV values that vary describing the second embodiment of the present invention;

FIG. 12A and FIG. 12B are schematic diagrams describing the second embodiment of the present invention;

FIG. 13 is a schematic diagram showing an example of real DSV values and counter values of a DSV counter;

FIG. 14 is a schematic diagram showing real DSV values and counter values of a DSV counter in a data arrangement according to the second embodiment of the present invention;

FIG. 16 is a schematic diagram showing DSV values in a data arrangement according to a third embodiment of the present invention;

FIG. 18 is a schematic diagram showing DSV values in the case that the data arrangement according to the third embodiment is encoded by a conventional EFM encoder;

FIG. 19 is a schematic diagram showing DSV values that vary in the case that the data arrangement according to the third embodiment of the present invention is encoded by a conventional EFM encoder;

FIG. 20 is a schematic diagram showing DSV values that vary in the case that the data arrangement according to the third embodiment of the present invention is encoded by a special EFM encoder;

FIG. 22A, FIG. 22B, and FIG. 22C are schematic diagrams describing the third embodiment of the present invention;

FIG. 24 is a block diagram showing a part of the structure of the EFM modulating portion according to the third embodiment of the present invention.

Figure 1:
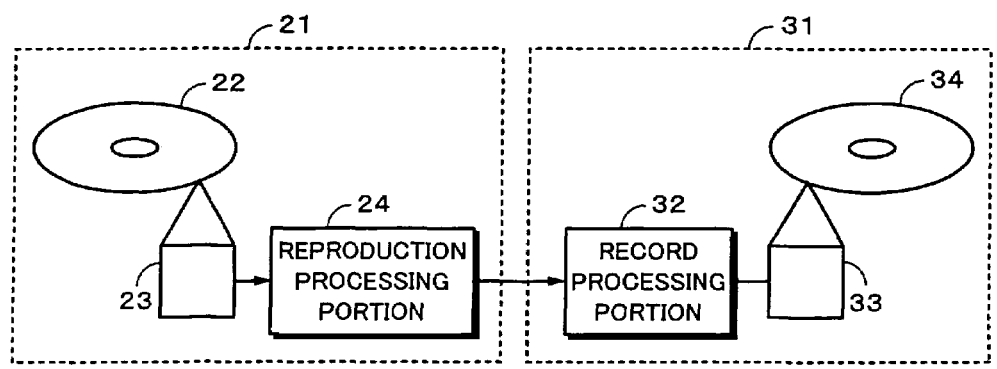
FIG. 1 is a schematic diagram describing a conventional copy process.

DETAILED DESCRIPTION OF THE PREFERRED EMBODIMENTS (First Embodiment)

Next, with reference to the accompanying drawings, a recording method according to a first embodiment of the present invention will be described. In the EFM modulation system, each data symbol (of eight data bits) is converted into a code symbol of 14 channel bits. The minimum time period Tmin (that is a time period of which the number of 0's between two 1's of a record signal) in the EFM modulation is 3T that is equivalent to a pit length of 0.87 µm. The pit length equivalent to 3T is the minimum pit length. Merging bits of three bits (also referred to as connection bits) are placed between two sequences of 14 bits each. In addition, a frame sync pattern is added at the beginning of a frame. A frame sync pattern is composed of a sequence of 11T, a sequence of 11T, and a sequence of 2T, where T is a period of one channel bit. Such a pattern does not take place in the EFM modulation rule. Thus, with such a special pattern, a frame sync can be detected. One EFM frame is composed of a total of 588 channel bits. The frame period is 7.35 kHz.

98 EFM frames compose a sub code frame (or a sub code block). A sub code frame of 98 EFM frames successively arranged in the vertical direction is composed of a frame synchronous portion, a sub code portion, data, and a parity portion. The frame synchronous portion detects the beginning of the sub code frame. One sub code frame is equivalent to 1/75 seconds of reproduction duration of a regular CD.

The sub code portion is composed of 98 EFM frames. The first two frames of the sub code portion are a synchronous pattern of the sub code frame and an out-of-rule pattern of the EFM standard. The bits of the sub code portion compose P, Q, R, S, T, U, V, and W channels.

The R channel to the W channel are used for special purposes such as still pictures and subtitles of so-called Karaoke. On the other hand, the P channel and Q channel are used for a track position control operation for a pickup that reproduces digital data recorded on a disc.

The P channel is used to record a signal whose level is "0" in a so-called lead-in area placed in an inner peripheral portion of a CD and whose level alternately varies between "0" and "1" in a so-called lead-out area placed in an outer peripheral portion thereof. In addition, the P channel is used to record a signal whose level is "1" in a music program of a program region placed between the lead-in area and the lead-out area of the CD and whose level is "0" not in a music program thereof. The P channel is used to search each music program when digital audio data is reproduced from a CD.

The Q channel is used to precisely control digital audio data that is reproduced from the CD. One sub code frame of the Q channel is composed of a synchronous bit portion, a control bit portion, an address bit portion, a data bit portion, and a CRC bit portion.

FIG. 2 shows an example of DSV control data that causes DSV values to deviate or diverge in the plus direction or minus direction. When one combination of two bytes shown in FIG. 2 is successively arranged, DSV values can be deviated in one direction. FIG. 2 shows five types of combinations. A first combination is (0x04 and 0xf9). A second combination is (0x65 and 0x9a). A third combination is (0x98 and 0xb9). A fourth combination is (0x9a and 0xb9). A fifth combination is (0x9a and 0xf9).

These combinations of two bytes of data symbols each cause DSV values to increase so that data that has been recorded in accordance with the conventional EFM modulation cannot correctly reproduced. When DSV values deviate in one direction, they adversely affect for example asymmetry compensation of the reproducing circuit. As a result, read disability takes place. In addition, since an error correction is incorrectly performed, the number of errors increases. Thus, whenever data of a predetermined region is read, the value thereof may vary. Beside the examples shown in FIG. 2, there are other DSV control data that are combinations of three bytes, four bytes, and so forth.

When merging bits that satisfy the EFM run length limit conditions (Tmin=3T and Tmax=11T) are selected in accordance with the conventional merging bit selection rule, the combinations of data symbols shown in FIG. 2 unconditionally designate merging bits. In other words, there is no possibility of which merging bits that cause DSV values that are increasing or decreasing to be decreased or increased are selected, respectively.

FIG. 3 shows an example of which a combination of data symbols that cause DSV values to diverge is recorded on a recording medium such as a CD-ROM. A CD-ROM has a data format of which 98 EFM frames (referred to as sub code frames) compose one sector (or block). Since data of 24 bytes can be placed in one EFM frame, one sector is (24×98=2352 bytes). One EFM frame contains 33 bytes (264 data bits) that are data of 24 bytes, parities Q and P of four bytes each, and a sub code of one symbol.

In mode 1 format of a CD-ROM, 2048 bytes of the foregoing 2352 bytes are user data. A sync (12 bytes), a header (4 bytes), an error detection code (4 bytes), an error correction code (276 bytes), and zero data (8 bytes) are added to the user data.

FIG. 3 shows a data arrangement of a part of data of a CD-ROM. Shaded data of the first row represents a CD sub code portion. Shaded data of the center portion represents data of a sync and data of a header of the CD-ROM format. However, for simplicity, it is assumed that the number of symbols contained in one EFM frame is smaller than the number of symbols in the format. The contents of a CD sub code, a sync, and a header are defined in the format. Thus, they cannot be freely replaced with a data pattern of DSV control data shown in FIG. 2. As described above, a frame sync is a fixed pattern of (11T+11T+2T). In a frame sync, merging bits cannot be selected. Unlike the foregoing CD sub code or the like, it is not necessary to substitute the frame sync with another data.

Figure 5:
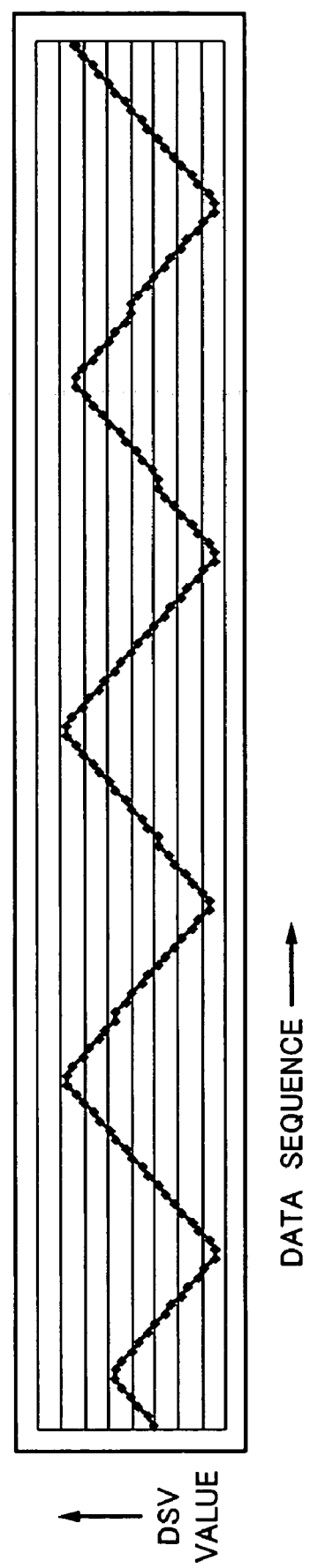
FIG. 5 is a schematic diagram showing DSV values that vary in accordance with a data arrangement.

FIG. 4 and FIG. 5 describe DSV values that vary in the data arrangement shown in FIG. 3. One dot shown in FIG. 5 corresponds to one data symbol. In the EFM modulation, a data symbol of eight bits is converted into a code symbol of 14 bits in accordance with an EFM conversion table (not shown). All the code symbols of 14 bits each satisfy the EFM rule of which the minimum time period Tmin (the time period of which the number of 0's between 1's of the record signal is minimum) is 3T and the maximum time period Tmax (the time period of which the number of 0's between 1's of the record signal is maximum) is 11T. For example, a data symbol (0x04) in hexadecimal notation is (00000100) in binary notation. The data symbol (0x04) is converted into a code symbol of 14 bits (01000100000000). Bit 1 of a code symbol represents a level inversion. Assuming that the DSV value of the 14-th bit of the preceding symbol (0x00) is 0, the DSV value of the merging bits and 14 bits of (0x04) becomes 5.

The next data symbol (0xf9) is converted into a code symbol (10000000010010). Merging bits are placed between two symbols. There are four types of patterns of merging bits that are (000), (001), (010), and (100). At the position of bit 1, the level is inverted. The data symbol (0x04) ends with a pattern of eight successive 0's. At the beginning of 0xf9, the level is inverted. Thus, to satisfy Tmin=3T and Tmax=11T, as margining bits, only (100) can be selected. At the end of (0xf9), the DSV value becomes (5+9=14).

In a data sequence of which data symbols (0x04) and (0xf9) are alternately repeated, the DSV values increase in the plus direction. However, when there is for example a shaded symbol 0xcc, the tendency of the divergence of the DSV values is lost. Thus, the DSV value varies in the minus direction. Due to a restriction on the format, for the shaded symbol, DSV control data for example 0x04 or 0xf9 cannot be selected. Thus, such inversion of a DSV value is based on the EFM modulation rule. In addition, when DSV values are varying in the minus direction, if there is a data symbol such as 0x40 that is necessary for the format, the DSV value is inverted in the plus direction. In FIG. 4, for a shaded data symbol, due to a restriction on the format, 0x04 or 0xf9 cannot be selected.

Thus, as shown in FIG. 5, in the data arrangement shown in FIG. 4, DSV values vary zigzag in a saw tooth wave shape. The read drive recognizes the average value of DSV values that vary zigzag in a saw tooth wave shape as DSV values, it treats the DSV values as almost 0. As a result, DSV values are not sufficiently deviated/diverged so that contents are prevented from being reading from the disc. As a result, the function for causing DSV values to deviate and the drive to prevent contents from being read from the disc cannot be fulfilled.

Next, copy detection or copy protection will be described. To prevent an application software that has been recorded on a CD-ROM from being copied to a disc, DSV control data is recorded as a predetermined position for example a predetermined file. When such a CD-ROM is loaded into a personal computer, data is automatically reproduced therefrom. First of all, a predetermined file is reproduced from the CD-ROM. In the case of an original CD-ROM, when a special EFM encoder with which the CD-ROM was produced is used, since DSV values do not deviate in one direction, the predetermined file can be correctly read. As a result, it is determined that the loaded CD-ROM is an original disc. Thereafter, application software that has been recorded on the CD-ROM can be started or installed.

On the other hand, when data is reproduced from an original CD-ROM and recorded on a disc such as a CD-R/RW, the conventional EFM encoding is performed. As a result, DSV values of the predetermined file deviate. Consequently, the predetermined file cannot be correctly read. In such a case, the next step for starting up the application software or installing it to a computer cannot be performed. At that point, a disc error may be displayed or the disc may be forcedly unloaded. As another example, a region in which data can be correctly read and a region in which data cannot be correctly read may co-exist. By designating "1" and "0" to the data readable region and the data non-readable region, respectively, secure information such as encryption key information can be accomplished.

According to the first embodiment, a problem of which the conventional EFM encoder of the CD-R/RW drive fails to cause DSV values to deviate in one direction can be solved. According to the first embodiment, special control data is followed by or preceded by data in which DSV control data cannot be placed so that the direction in which DSV values vary after the data in which the DSV control data cannot be place is the same as the direction in which DSV values vary before the data. As a result, even after the data in which DSV control data cannot be placed, DSV values can be deviated. Since DSV values can be sufficiently deviated/diverged, the read drive can be prevented from reading contents from the disc.

FIG. 6 shows an example of a data arrangement of a CD-ROM format according to the first embodiment of the present invention. In the data arrangement, shaded data in which DSV control data cannot be placed due to a restriction on the CD-ROM format is followed by special control data of two bytes (0x85) and (0x93).

Figure 8:
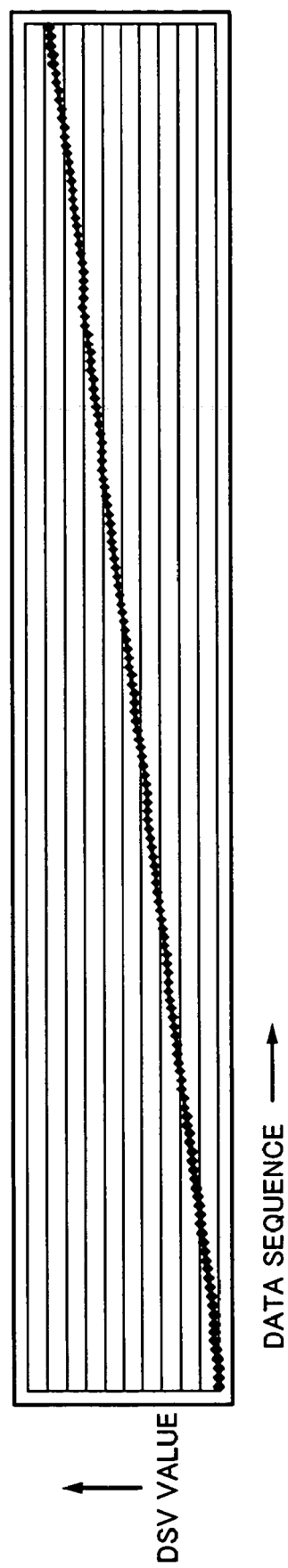
FIG. 8 is schematic diagrams showing DSV values in data arrangements according to the first embodiment of the present invention.

FIG. 7 shows DSV values that vary according to the first embodiment. FIG. 8 is a graph showing DSV values that vary in the case that the data arrangement shown in FIG. 7 is represented as a data sequence on the horizontal axis. FIG. 7 and FIG. 8 show that DSV control data and special control data cause DSV values that vary zigzag in a saw tooth wave shape to vary in one direction (they increase in FIG. 8). In other words, the DSV control data and the special control data allow the drive to have a situation of which it cannot read contents from the disc.

Next, with reference to FIG. 9A, FIG. 9B, and FIG. 9C, a method for controlling merging bits and DSV values will be described. FIG. 9A shows a data arrangement of code symbols corresponding to data symbols of which for example (0x04) and (0xb9) are alternately placed (hereinafter, this data arrangement is referred to as main data).

When the data arrangement is EFM modulated, a data sequence of which (01000100000000) and (100000000010) are alternately placed is generated. Plus and minus (high level and low level of a signal wave form) of DSV values are represented by "1" and "0", respectively.

To satisfy the foregoing EFM rule (Tmin=3T and Tmax=11T), merging bits placed between (0x04) and (0xb9) are unconditionally designated (100). Likewise, merging bits placed between (0xb9) and (0x04) are unconditionally designated (000). In the example shown in FIG. 9A, the DSV values diverge in the plus direction.

In a data sequence of which merging bits are unconditionally designated, the diverging direction of DSV values depends on whether the start bit of the main data of the data sequence is plus ("1") or minus ("0") (pit or land on the disc). In FIG. 9A, the code symbol (DSV value) of 14 bits of the first main data (0x04) is plus (pit). In this case, the DSV values of all the data sequence diverge in the plus direction. In other words, after a data sequence in which any data cannot be placed due to a restriction on the format, if the direction of the start bit (pit or land) of the start data can be defined, DSV values of the next data sequence can be diverged in one direction. As a result, DSV values of all the data sequence can be diverged in one direction.

FIG. 9B and FIG. 9C show a real example of an arrangement of special control data of two bytes immediately preceded by main data in which any data cannot be placed. Special control data (0x85) is converted into 14 bits (00000000100001). Special control data (0x93) is converted into 14 bits (00100000100001). FIG. 9B shows the case that the start bit of special control data is minus (land). FIG. 9C shows the case that the start bit of special control data is plus (pit).

In this case, what is considered is to control merging bits placed between special control data of two bytes (0x85) and (0x93). As merging bits that satisfy the run length limit rule of the EFM modulation, (000) and (001) can be placed. Normally, in the EFM modulation, when merging bits are selected, first of all, the rule of the EFM modulation should be satisfied. When merging bits can be selected, merging bits are selected so that the DSV values are kept 0. Thus, as shown in FIG. 9B, when the start bit is minus (land), if the preceding DSV control data causes the preceding DSV values to be plus, merging bits are selected so that minus values are dominant in the DSV values. Thus, (000) are selected as merging bits placed between the data sequences (0x85) and (0x93).

As shown in FIG. 9C, when the start bit of the control data sequence is plus (pit), if the preceding DSV control data causes the DSV values to be plus, merging bits are selected so that minus values are dominant in the DSV values. Thus, (001) are selected as merging bits. In such a manner, two sequences of merging bits are selected.

The last bit of the last main data (0x93) of special control data of two bytes becomes plus (pit). Merging bits placed between main data (0x93) and the start main data (0x04) of the next diverging DSV control data sequence are unconditionally designated. As a result, (000) are selected. Thus, the start bit of the main data (0x04) becomes plus (pit). As a result, the next DSV values can be diverged in the plus direction. In other words, the direction of which the DSV values vary can be kept plus.

Thus, when a special control data sequence of two bytes is immediately preceded by main data in which any data cannot be placed, after a data sequence of which it is unknown whether the start bit is plus or minus, the sign of the start bit of the diverging control data sequence preceded by the special control data sequence can be kept constant (plus in the example of FIG. 8). As a result, DSV values can be diverged in one direction.

According to the first embodiment of the present invention, in a data format such as a CD-ROM of which DSV control data cannot be placed, but normal data due to a restriction on the format, DSV values can be deviated in the plus direction or minus direction. As a result, copy detection or copy protection can be performed. Moreover, in an audio CD, a DSV value in a sub code area can be prevented from being inverted. As a result, it can be further expected for DSV values to be deviated. Thus, the function for copy detector or copy protection can be improved.

In a disc on which a signal of which the foregoing control data, special control data, and data that cannot be changed due to a restriction on the format are normally encoded using EFM in such as a CD-R/RW disc is recorded, when data is reproduced from the disc, since DSV values largely increase, the data cannot be correctly read. This means that even if data is reproduced from an original CD, the reproduced data is encoded by a conventional encoder, and then the encoded data is recorded on a medium such as a CD-R disc, data cannot be correctly read from the medium. As a result, copy protection can be accomplished.

In addition, the use of contents in a region for other than DSV control data and special control data can be permitted or prohibited. In other words, a data pattern portion can be reproduced from a disc whose contents were produced using the special encoder according to the present invention. On the other hand, a data pattern portion cannot be reproduced from a disc whose contents were created as an original disc using the conventional encoder. Thus, depending on whether or not a data pattern portion can be read from a disc, it can be determined whether or not the disc is an original disc or a copy disc. Corresponding to the determined result, it can be determined whether or not contents other than the data pattern portion can be used. As a result, contents of a copy disc can be prohibited from being used.

(Second Embodiment)

Next, a second embodiment of the present invention will be described. According to the first embodiment, when the DSV counter has a sufficiently long bit length, even if DSV control data cannot be placed due to a restriction on the format, DSV values are continuously deviated and diverged. However, when the DSV counter has a bit length of for example eight bits and the counter value exceeds +127, if an overflow takes place in the DSV counter and it outputs a count value recognized as a minus value (−128), a problem of which the DSV values do not diverge will take place. The second embodiment solves such a problem.

FIG. 10 and FIG. 11 describe a problem that takes place when a DSV value exceeds +128. As is clear from the comparison of a table of DSV values that vary according to the first embodiment shown in FIG. 7 and a table of DSV values shown in FIG. 10, DSV values gradually vary. In addition, DSV values cyclically increase and decrease. Thus, as shown in FIG. 11, DSV values vary zigzag around a value 127. When. DSV values vary, not diverge, since the read drive recognizes an average value of DSV values, an effect of which a data read trouble takes place is lost.

Next, the reason why DSV values vary zigzag in the case that the DSV counter has a bit length of for example eight bits, not a long bit length, will be described. FIG. 12A and FIG. 12B show merging bits controlled by the conventional encoder in the case that a DSV value is minus. In FIG. 12A and FIG. 12B, (0x85) and (0x93) are special control data that is preceded by a data sequence that cannot be controlled due to a restriction on the format. The special control data causes the start bit of the next data sequence that is preceded by a plus DSV value to start with a plus value (pit).

FIG. 12A shows the case that (0x85) at the beginning of special control data starts with a minus value (land). As merging bits placed between the first byte (0x85) and the next byte (0x93), one of two types of merging bits (000) and (001) can be selected. In the normal EFM modulation rule, to converge DSV values to 0, merging bits whose values are different from the preceding DSV value are selected. If the preceding DSV value is plus, (000) are selected as merging bits because minus values are dominant therein. In contrast, when the preceding DSV value is minus, (001) are selected as merging bits because plus values are dominant therein. In the example shown in FIG. 12A, the preceding DSV value is minus. In this case, (001) are selected as merging bits because plus values are dominant therein. In this case, the start bit of data preceded by the last byte 0x93 of the special control data is minus (land).

When the start bit of the DSV control data sequence preceded by the special control data sequence is plus (pit), DSV values diverge in the plus direction. When the start bit of the DSV control data sequence is minus (land), DSV values diverge in the minus direction. Thus, in the example shown in FIG. 12A, the next data sequence causes DSV values to diverge in the minus direction.

FIG. 12B shows the case that (0x85) at the beginning of the special control data is plus (pit). In this case, when the preceding DSV value is minus, the start bit of data preceded by the special control data sequence is minus (land). Thus, the DSV control data sequence preceded by the special control data sequence causes DSV values to diverge in the minus direction.

FIG. 13 shows a table of which DSV counter values are added to the table shown in FIG. 10. In FIG. 13, shaded portions are regions of which a DSV counter overflows and DSV values are incorrectly recognized as minus values. When data that cannot be controlled is placed in a region that is recognized as a minus value and then followed by a control data sequence, if DSV values start deviating in the plus direction, the DSV values inversely deviate in the minus direction. As a result, the real DSV values do not diverge in the plus direction. As shown in FIG. 11, the DSV values zigzag vary. Apparent DSV values that the DSV counter outputs become minus. The positions that DSV values zigzag vary in the data sequence can be pre-calculated.

Figure 14:
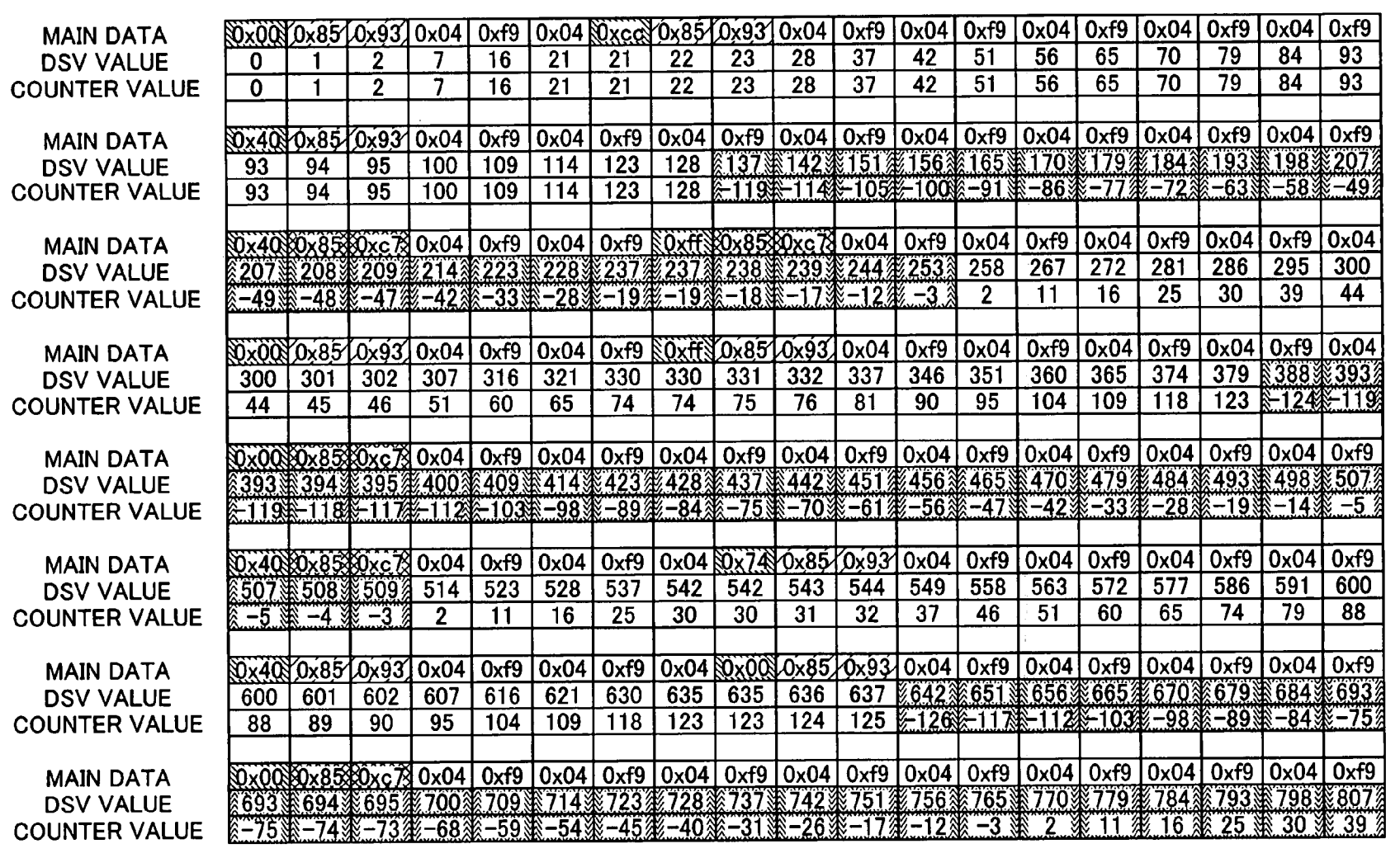
Figure 15:
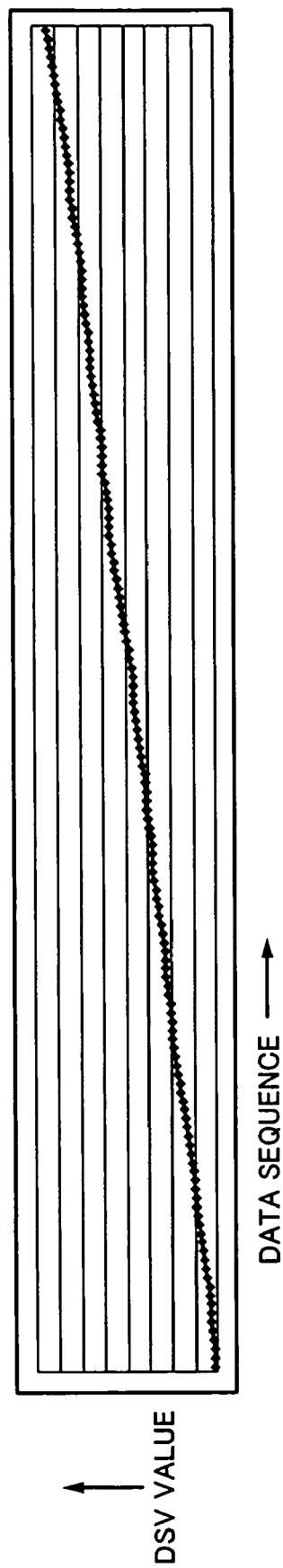
FIG. 15 is a schematic diagram showing DSV values that vary according to the second embodiment of the present invention.

Next, the second embodiment of the present invention applied to the case that the DSV counter has a bit length of eight bits will be described. FIG. 14 shows an example of a data arrangement according to the second embodiment of the present invention. FIG. 15 is a graph of DSV values that vary in the data arrangement shown in FIG. 14. As is clear from FIG. 14 and FIG. 15, even if there are regions of which DSV counter values are minus, DSV values continuously deviate in the plus direction. In FIG. 14, although DSV counter values fluctuate in both the plus and minus directions, the real DSV values simply deviate in the plus direction.

The reason why the direction in which real DSV values vary inverts is in that the DSV counter values as apparent DSV values overflow, the DSV values that are plus values are apparently minus values, and the DSV control data sequence causes data to deviate in the inverse direction. According to the second embodiment, positions at which apparent DSV values are minus are pre-calculated. Unlike the case that a DSV control data sequence of which apparent DSV values are minus causes a plus DSV value to be followed by a data sequence whose DSV values deviate in the plus direction, a combination of DSV control data sequences that cause a minus DSV value to be followed by a data sequence whose DSV values deviate in the plus direction is placed so that the real DSV values zigzag vary.

In FIG. 14, shaded portions are regions of which DSV values of the DSV counter are minus. The shaded portions are data required on the format. Thus, data that cannot be substituted with DSV control data is followed by special control data of a combination of two bytes of (0x85) and (0xc7) instead of special control data of (0x85) and (0x93). A DSV control data sequence that is present in a region of which counter values of the DSV counter are plus is a combination of (0x85) and (0x93).

According to the second embodiment, since special control data sequences are placed at predetermined positions, in the case that since the DSV counter has a bit length of eight bits, when the counter value exceeds +127, an overflow takes place and the counter value is recognized as a minus value, as shown in FIG. 15, all DSV values can be diverged in one direction. It should be noted that the special control data described in the second embodiment is just an example. There would be data that could accomplish the same effect.

According to the second embodiment of the present invention, even if an encoder system has a DSV counter whose bit length is small and an overflow takes place therein, the system cause DSV values of copied data to deviate. As a result, it can be sufficiently expected that since DSV values of copied data deviate, they prevent the read drive from correctly reading copied data. In addition, it can be determined whether or not contents are read from an original optical disc.

(Third Embodiment)

Next, a third embodiment of the present invention will be described. According to the third embodiment, data that causes DSV values to deviate in one direction or the inverse direction in accordance with a characteristic of an encoder (this data is referred to as second special control data) is placed in the middle of a data sequence to which the maximum effect of deviation of DSV has been designated. As a result, all a data sequence is created so that the EFM encoder of the conventional CD-R/RW drive or the like causes DSV values to deviate in one direction and the special encoder of such as an optical disc production apparatus or the like to prevent DSV values from deviating.

Figure 17:
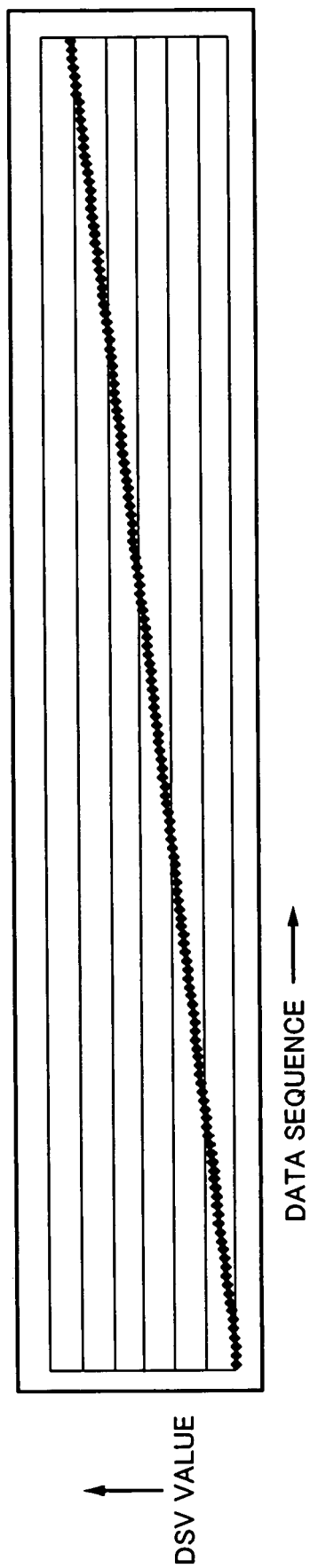
FIG. 17 is a schematic diagram showing DSV values that vary in a data arrangement according to the third embodiment of the present invention.

FIG. 16 shows an example of data that causes DSV values to deviate/diverge when the data is encoded by the conventional EFM encoder. In FIG. 16, shaded portions at the beginning of each line are data regions for a sub code or the like in which DSV control data cannot be placed. The next hatched portions (two bytes of (0x85) and (0x93)) are the first special control data that is used in the first embodiment and the second embodiment. When the first special control data is preceded by data that cannot be substituted with any data due to a restriction on the format, DSV values of the next data sequence can be increased in one direction. When two bytes of (0xb9) and (0x98) are repeated as a DSV control data sequence, since merging bits that merge bytes cannot be selected, the DSV values simply increase. FIG. 17 is a graph showing DSV values that vary in the data sequence shown in FIG. 16.

FIG. 18 shows a data sequence according to the third embodiment and DSV values of which the data sequence has been encoded by the encoder of the conventional CD-R/RW drive or the like. In FIG. 18, dotted portions (0xdf) are second special control data. FIG. 19 is a graph showing DSV values that vary in the data sequence shown in FIG. 18. In FIG. 19, like the case shown in FIG. 17, DSV values simply increase and diverge. According to the third embodiment, the conventional EFM encoder causes DSV values to diverge.

Figure 21:
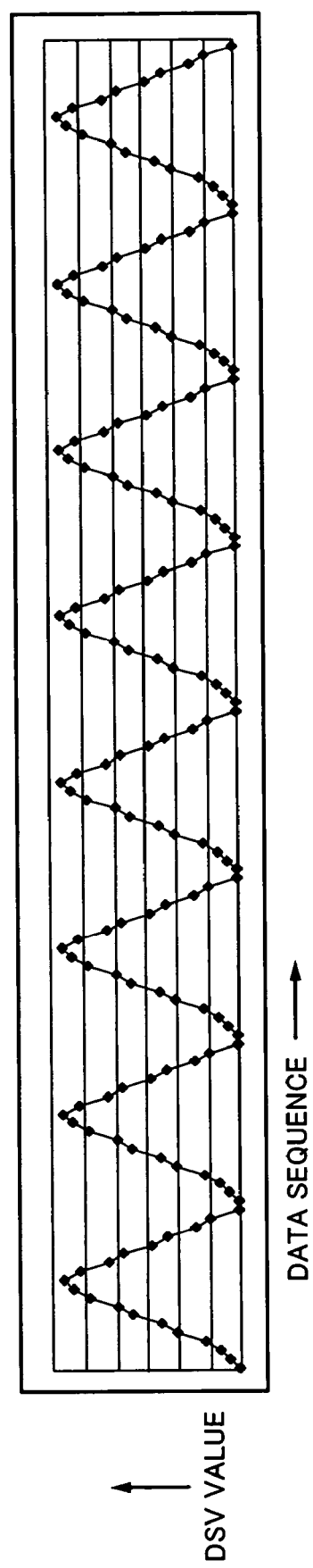
FIG. 21 is a schematic diagram showing DSV values that vary in the case that the data arrangement according to the third embodiment of the present invention is encoded by a special EFM encoder.

FIG. 20 shows DSV values of which the data sequence according to the third embodiment has been encoded by a special EFM encoder used in a CD production factory or the like. In FIG. 20, a portion at the beginning of each line (for example, 1 EFM frame) is for example a sub code in which DSV control data cannot be placed due to a restriction on the format. The portion is followed by two bytes of the first special control data (0x85) and (0x93) that cause DSV values to deviate/diverge. In addition, according to the third embodiment, as second special control data, a dotted portion (0xdf) is placed. FIG. 21 is a graph showing DSV values that vary in the data sequence shown in FIG. 20.

As shown in FIG. 21, according to the third embodiment, DSV values do not deviate/diverge unlike with the cases shown in FIG. 17 and FIG. 19. In FIG. 21, DSV values vary upward and downward in a saw tooth shape. It is clear that DSV values bend in the minus direction due to the second special control data as dotted portions. According to the third embodiment, the second special control data is placed at almost center position of each EFM frame. The intervals of the second special control data are not limited to such an example. However, when the intervals of the second special control data are too large, when contents are read, a read error would take place. According to the third embodiment, when the data sequence is encoded by the conventional EFM encoder, DSV values deviate/diverge. When the data sequence is encoded by the special EFM encoder used in a CD production factory, DSV values can be prevented from deviating/diverging.

According to the third embodiment, when a CD player, a CD-ROM drive, and a CD-R/RW drive reproduces data from an original disc (CD, CD-ROM, or the like) produced in a CD production factory or the like, since DSV values do not deviate/diverges, they can normally reproduce data from the disc. In contrast, in the case that data reproduced from an original disc is recorded to another disc as a copy disc by the conventional EFM encoder, when the data is reproduced from the copy disc, since DSV values deviate/diverge, the copy protection of the original disc can be substantially performed. In addition, it can be determined whether a disc loaded into the player is an original disc or a copy disc.

Next, with reference to FIG. 22A, FIG. 22B, and FIG. 22C, the theory of the third embodiment will be described. FIG. 22A shows original eight-bit data symbols of a portion whose DSV values simply increase other than a portion to which the present invention is applied, 14-bit code symbols into which the original data symbols have been converted, and merging bits that merge code symbols. In accordance with the EFM run length limit rule, in the portion of which DSV values simply increase, merging bits are unconditionally designated. As a result, it is clear that DSV values simply increase.

FIG. 22B shows main data, 14-bit data, and DSV values according to the present invention in the case that the main data is encoded by a conventional EFM encoder of a CD-R/RW drive or the like. When FIG. 22B is compared with FIG. 22A, the center eight-bit data is changed from (0x98) to (0xdf). One of two types of patterns (000 or 001) can be selected as merging bits placed between the DSV control data (0xdf) according to the present invention and the immediately preceding code symbol (0xb9).

When merging bits can be selected, the conventional EFM encoder of the CD-R/RW drive selects them so that DSV values of the next code symbol become minimum. In the example shown in FIG. 22B, when (000) are selected as merging bits, the DSV values become minimum. Only one pattern (000) can be selected as merging bits placed between the code symbol (0xdf) of the second special control data and the next code symbol (0xb9). At that point, the arrangement of DSV values of the next code symbol is the same as the arrangement of DSV values as a diverging pattern shown in FIG. 24A. Thus, when the data is followed by the DSV control data, all the DSV values diverge.

FIG. 22C shows main data, 14-bit data, and DSV values according to the present invention in the case that the main data is encoded by an EFM encoder used in a CD production factory or the like. Although the data arrangement of the main data shown in FIG. 22C is the same as the main data encoded by the conventional EFM encoder of the CD-R/RW drive or the like shown in FIG. 24B. However, selected merging bits placed between the symbol (0xb9) immediately followed by the second special control data and the symbol (0xdf) of the second special control data shown in FIG. 24C are different from those shown in FIG. 24B.

The special EFM encoder used in the CD production factory or the like controls merging bits that are selected so that DSV values of the immediately following data symbol and the next data symbol become minimum. Such a controlling operation is sometimes referred to as two-byte look ahead control. In this case, a pattern (001) is selected as merging bits. As a result, the DSV values of the symbol (0xdf) of the second special control data become larger than those of the DSV controlling method shown in FIG. 22B. However, although merging bits placed between the symbol (0xdf) and the next symbol (0xb9) are unconditionally selected, it is clear that the arrangement of DSV values is an inversed pattern of the arrangement of DSV values that diverge. Thus, in the data sequence preceded by the DSV control data (0xb9), DSV values decrease.

The controlling method according to the third embodiment of the present invention can be extended so that the DSV states of symbols ahead of more than two bytes can be determined.

As described above, according to the third embodiment, the special EFM encoder used in the CD production factory or the like performs the two-byte look-ahead control. In addition, since special DSV control data is placed in the middle of the arrangement of data whose DSV values diverge, all the DSV values can be prevented from zigzag diverging. The conventional EFM encoder that is used in the CD-R/RW drive or the like can necessarily and sufficiently control DSV values of the immediately following data symbol. Although the circuit scale of the conventional EFM encoder can be reduced, in a data sequence of such DSV control data and particular DSV control data, all DSV values diverge.

According to the third embodiment, data can be correctly reproduced from a CD-ROM disc that was produced in a disc factory, data cannot be correctly reproduced from a recoding medium such as a CD-R/RW disc as a copy disc of the CD-ROM disc because DSV values of data reproduced from the copy disc diverge. Thus, such contents can be prevented from being copied from a copy disc. In addition, depending on whether or not a region of which special data is added for controlling DSV values can be read, it can be determined whether or not the loaded disc is a copy disc.

Figure 23:
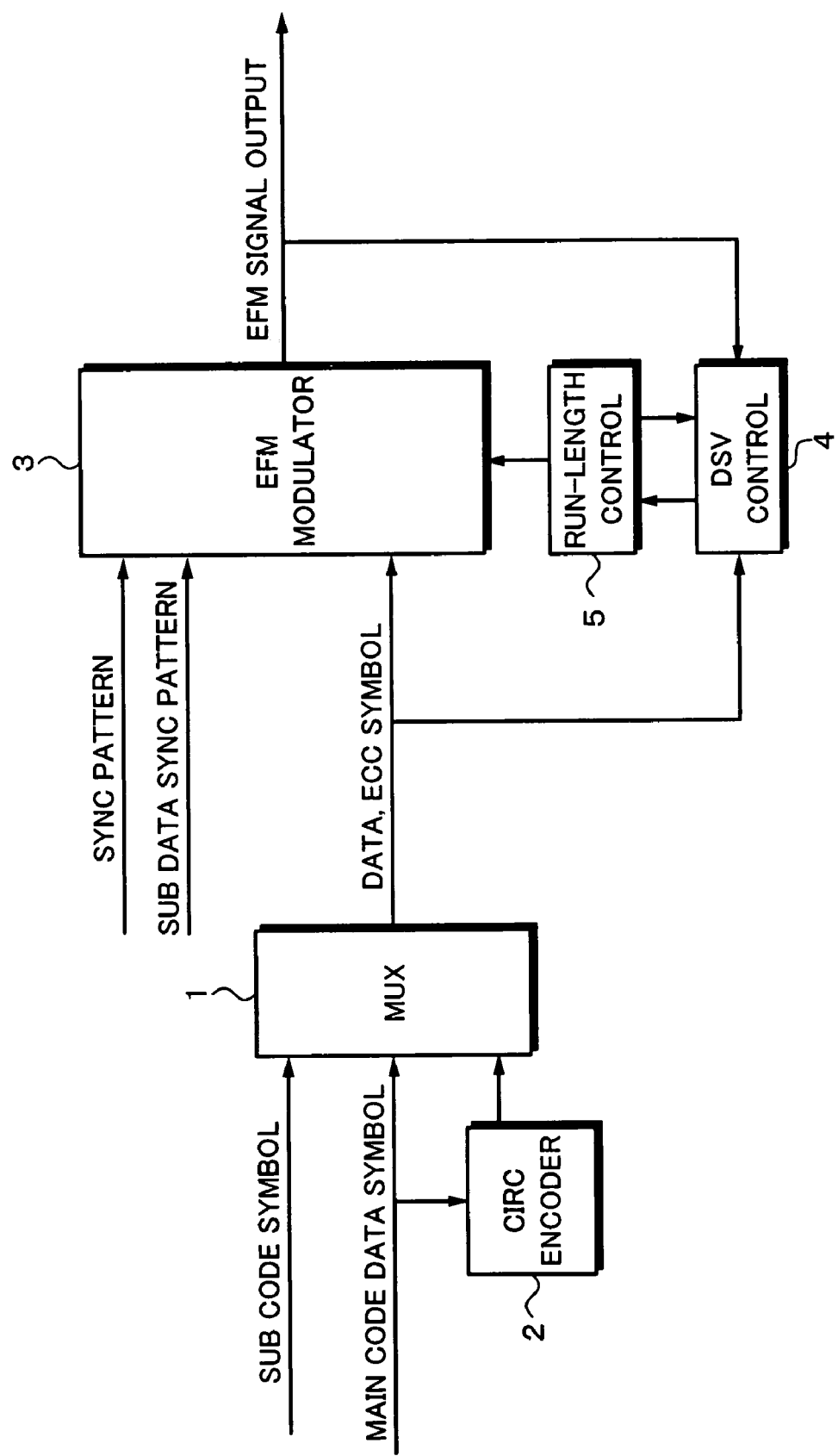
FIG. 23 is a block diagram showing an example of a structure of an EFM modulating portion according to the third embodiment of the present invention.

FIG. 23 shows a structure of a principle portion of a record signal generating apparatus according to the third embodiment of the present invention. The record signal generating apparatus is used in a mastering process for producing a disc at factory. An output signal of the record signal generating apparatus is supplied to a cutting device. In FIG. 23, a main code data symbol and a sub code data symbol are supplied to a multiplexer represented by 1.

The main code data symbol is supplied to a cross interleave Reed-Solomon code (CIRC) encoder 2. The CIRC encoder 2 performs an error correction code encoding process for adding error correction parity data or the like to the main code data symbol and a scramble process for the encoded data. In other words, the CIRC encoder 2 divides one word of 16 bits into two portions of high order eight bits and low order eight bits as two symbols and performs the error correction code encoding process and the scramble process for each symbol. An ECC symbol generated by the CIRC encoder 2 is input to the multiplexer 1.

The multiplexer 1 generates a data sequence of which a main code data symbol, a sub code data symbol, and a parity symbol (ECC symbol) are placed at predetermined positions of one frame. The data sequence is supplied to the EFM modulator 3. In addition, a frame sync pattern and a sub data sync pattern are supplied to the EFM modulator 3. The EFM modulator 3 outputs an EFM signal. The EFM modulator 3 comprises an 8-14 converting portion and a merging bit selecting portion. The 8-14 converting portion converts a data symbol of eight bits into a code symbol of 14 channel bits in accordance with a conversion table. The merging bit selecting portion selects merging bits.

The EFM signal is input to a DSV control portion 4. The DSV control portion 4 detects DSV from the EFM signal and outputs the detected DSV to a run length control portion 5. The run length control portion 5 causes the merging bit selecting portion of the EFM modulator 3 to select merging bits so that the EFM run length limit condition is satisfied. As a result, the merging bit selecting portion selects merging bits so that the EFM run length condition is satisfied.

FIG. 24 shows an example of a structure of the DSV control portion 4. According to the third embodiment, as described above, when merging bits placed between DSV control data (0xb9) and special control data (0xdf) are selected, the merging bits are selected so that DSV values of not only the data (0xdf) but the next data (0xb9) become minimum. The DSV control portion 4 performs such two-byte look-ahead control.

In FIG. 24, a merging bit control portion represented by reference numeral 12 has a two-byte look-ahead control function for selecting merging bits. A code symbol control portion represented by reference numeral 13 controls special control data (0xdf) that is placed. A DSV value is supplied from a DSV counter 11 to the merging bit control portion 12 and the code symbol control portion 13. An output signal of the EFM modulator 3 is input to the DSV counter 11. For example, values "1" and "0" of the output signal are supplied as an addition input and a subtraction input, respectively.

The merging bit control portion 12 controls the merging bit selecting portion of the EFM modulator 3 through the run length control portion 5. The merging bit selecting portion selects merging bits so that DSV values of the next code symbol become minimum. In addition, the code symbol control portion 13 controls the code symbol selecting portion of the EFM modulator 3 through the run length control portion 5. The code symbol selecting portion places second special control data for example (0xdf) at a predetermined position.

The output EFM signal of the EFM modulator 3 is supplied to an optical pickup of a cutting device through a recording circuit. The cutting device comprises a laser device (for example, a gas laser or a semiconductor laser), an optical modulator of acousto-optical effect type or electro-optical type that modulates laser light radiated from the laser device, and an optical pickup that has an objective lens or the like that collects the laser light that passes through the optical modulator and radiates laser light to a photoresist surface of a disc-shaped glass substrate on which photoresist as a photosensitive material is coated. The optical modulator modulates laser light in accordance with a record signal. A modulated laser beam exposes the photoresist on the glass substrate. The glass substrate is developed and electrically plated. As a result, a metal master is produced. Thereafter, a mother disc is produced from the metal master. Thereafter, a stamper is produced from the mother disc. With the stamper, an optical disc is produced by a compression casting method or an injection casting method.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention. For example, the present invention can be applied to a multi-session optical disc for CD format data and CD-ROM format data. In addition, as information recorded on the optical disc, there are various types of data such as audio data, video data, still picture data, character data, computer graphic data, game software, and computer programs. In addition, the present invention can be applied to card-shaped data recording mediums as well as disc shaped data recording mediums.

As is clear from the foregoing description, according to the present invention, even if there is data in which DSV control data cannot be placed due to a restriction on the data format of the recording medium, when the data is immediately followed by special control data of two bytes or more, DSV values can be deviated or diverged.

In addition, according to the present invention, even if the DSV counter overflows and an apparent DSV value that is output from the DSV counter becomes minus, when another special control data is placed, DSV values can be prevented from deviating or diverging.

According to the present invention, since the second special control data does not cause DSV values to deviate/diverge, DSV values can be zigzag varied. As a result, data can be recorded so that it can be reproduced without read disability.

What is claimed is:

1. A data recording method for recording digital data in accordance with a digital modulation system for converting a data symbol having a first predetermined number of bits into a code symbol having a second predetermined number of bits that is larger than the first predetermined number of bits and placing merging bits between code symbols so as to generate record data whose run length is restricted, the method comprising the steps of:

recording digital-sum-variation control data that causes digital-sum-variation values to deviate in a plus direction or a minus direction and read disability of data that is reproduced to take place in at least part of a recording region;

placing special control data of two symbols or more after data in which the digital-sum-variation control data cannot be recorded due to a restriction on a data format of a recording medium; and causing the start bit of a code symbol of the digital-sum-variation control data immediately preceded by the special control data to be fixed regardless of whether the value at the beginning of the code symbol of the special control data is "0" or "1" so as to deviate the digital-sum-variation values in the plus direction or minus direction.

2. The data recording method as set forth in claim 1, wherein the digital-sum-variation control data is configured to cause merging bits to be unconditionally designated in accordance with a rule of the digital modulation system.

3. The data recording method as set forth in claim 1, further comprising the step of:

pre-obtaining a position at which an apparent digital-sum-variation value that a digital-sum-variation counter outputs becomes minus when the digital modulation causes the digital-sum-variation counter to overflow; and placing other special control data that is different from the special control data that causes digital-sum-variation values of the next data sequence to deviate in the plus direction at the obtained position where the digital-sum-variation value is minus so as to deviate digital-sum-variation values in the plus or minus direction.

4. A data recording method for recording digital data in accordance with a digital modulation system for converting a data symbol having a first predetermined number of bits into a code symbol having a second predetermined number of bits that is larger than the first predetermined number of bits and placing merging bits between code symbols so as to generate record data whose run length is restricted, the method comprising the steps of:

recording digital-sum-variation control data that causes digital-sum-variation values to deviate in a plus direction or a minus direction and read disability of data that is reproduced to take place in at least part of a recording region;

placing first special control data of two symbols or more after data in which the digital-sum-variation control data cannot be recorded due to a restriction on a data format of a recording medium;

placing second special control data that is different from the first special control data in the digital-sum-variation control data;

causing the first special control data to set the start bit of a code symbol of the digital-sum-variation control data immediately preceded by the first special control data to "0" or "1" regardless of whether the value at the beginning of the code symbol of the first special control data is "0" or "1" so as to deviate the digital-sum-variation values in the plus direction or minus direction; and causing the second special control data to set the start bit of the code symbol of the digital-sum-variation control data immediately preceded by the second special control data to "0" or "1" that is different from the start bit that is set by the first special control data so as to deviate the digital-sum-variation values in the plus direction or minus direction that is different from the direction that is set by the first special control data.

5. The data recording method as set forth in claim 4, further comprising the step of:

selecting merging bits so that the digital-sum-variation values of the next code symbol of the code symbol of the second special control data become small when the merging bits are placed between the code symbol of the digital-sum-variation control data and the code symbol of the second special control data.

* * * * *